United States Patent [19]

Sato

[11] Patent Number: 5,351,188

[45] Date of Patent: Sep. 27, 1994

[54] ELECTRONIC DEPTH METER

[75] Inventor: Hiroshi Sato, Hamura, Japan

[73] Assignee: Casio Computer Co., Ltd., Tokyo, Japan

[21] Appl. No.: 976,399

[22] Filed: Nov. 13, 1992

[30] Foreign Application Priority Data

| Nov. 20, 1991 | [JP] | Japan | 3-332424 |
| Nov. 20, 1991 | [JP] | Japan | 3-332425 |
| Aug. 7, 1992 | [JP] | Japan | 4-231587 |
| Aug. 7, 1992 | [JP] | Japan | 4-231588 |

[51] Int. Cl.$^5$ ............................................. G06F 15/00
[52] U.S. Cl. ........................ 364/413.31; 364/558; 72/865.1; 128/201.27; 340/626
[58] Field of Search .................. 340/626; 368/10; 73/291, 301, 865.1, 753, 714; 128/201.27; 364/413.31, 558, 705.01

[56] References Cited

U.S. PATENT DOCUMENTS

| 4,466,285 | 8/1984 | Allemano | 73/432 R |
| 4,604,737 | 8/1986 | Hoffman | 364/418 |
| 4,658,358 | 4/1987 | Leach et al. | 364/418 |
| 4,753,117 | 6/1988 | Osterhout et al. | 364/558 |
| 4,882,678 | 11/1989 | Hollis et al. | 364/418 |
| 5,031,160 | 7/1991 | Koizumi et al. | 368/10 |
| 5,148,376 | 9/1992 | Sato | 364/558 |

Primary Examiner—Jack B. Harvey
Assistant Examiner—Craig Steven Miller
Attorney, Agent, or Firm—Frishauf, Holtz, Goodman & Woodward

[57] ABSTRACT

The respective partial pressures of an inert gas in the tissues of a human body different in saturation half-time are calculated from the sensed ambient pressure during diving. The respective remaining times of the tissues up to the non-decompression limit are calculated from the obtained partial pressures of the inert gas and are displayed simultaneously on a graphic display.

41 Claims, 25 Drawing Sheets

| R | SF | i | TA |
|---|---|---|---|
| GS | X | SM | TM |

| | | | | | | |
|---|---|---|---|---|---|---|
| LINE ADDRESS 1 | Q1 | Q2 | Q3 | Q4 | Q5 | Q6 |
| LINE ADDRESS 2 | MF1 | MF2 | MF3 | MF4 | MF5 | MF6 |
| LINE ADDRESS 3 | MT1 | MT2 | MT3 | MT4 | MT5 | MT6 |
| LINE ADDRESS 4 | GT1 | GT2 | GT3 | GT4 | GT5 | GT6 |

DATA STORAGE DM

FIG. 2

| TISSUE | SATURATION HALF-TIME (MINUTES) | M-VALUE(bar) | | |
|---|---|---|---|---|
| | | M(10) | M(20) | . . . |
| M-1 | 2.5 | 3.606 | 3.897 | . . . |
| M-2 | 5 | 3.106 | 3.397 | . . . |
| M-3 | 10 | 2.502 | 2.791 | . . . |
| M-4 | 20 | 2.050 | 2.334 | . . . |
| M-5 | 40 | 1.697 | 1.974 | . . . |
| M-6 | 80 | 1.561 | 1.829 | . . . |

FIG. 3

ELECTRONIC DEPTH METER

BACKGROUND OF THE INVENTION

The present invention relates to electronic depth meters which calculate the partial pressures of an inert gas in the tissues of a human body different in saturation half-time during diving and obtains data on non-decompression or decompression diving from the partial pressures of the inert gas in the tissues.

When a diver has stayed at a position deeper than a predetermined depth for more than a given time, he is required to be subjected to decompression which involves staying at a designated depth for a predetermined time so as to avoid suffering from a submarine sickness when ne ascends to the water surface.

In order to provide easy decompression, for example, U.S. Pat. No. 4,835,716 discloses an electronic depth meter which calculates a decompression stop depth and a decompression stop time from the deepest diving depth and the diving time using a table of decompression which is created by the U.S. Navy and displays these data digitally. Another electronic depth meter has been proposed which has the function of calculating and displaying the remaining time in which the diver can ascend without being subjected to decompression or the remaining time up to a non-decompression limit on the basis of the maximum depth and diving time.

If a diver wants to ascend without being subjected to decompression after he dived, he is required to recognize the remaining time up to a non-decompression limit using an electronic depth meter such as that mentioned above and to ascend before the remaining time before the non-decompression limit becomes 0. If the remaining time before the non-decompression limit has become 0, he must stop this ascent at a specified decompression stop depth, stay and be subjected to decompression at that decompression depth for a decompression stay time on the basis of data indicated by an electronic depth meter such as that mentioned above for ascending purposes.

Such electronic depth meter obtains decompression data on the assumption of the diver's stay throughout a diving interval of time at the maximum depth in consideration of maximum safety, so that the non-decompression limit is excessively short.

Under such situations, electronic depth meters have been invented which calculate respective quantities of nitrogen in the tissues of a human body on a real time basis and obtain and display data on appropriate decompression on the basis of those quantities of nitrogen, as disclosed in U.S. Pat. Nos. 4,005,282; 4,192,001; and 4,054,783. These depth meters classify the tissues of a human body according to saturation half-time (the time taken to reach 50% of a saturated quantity of nitrogen) in consideration of the rates of dissolution and discharge of nitrogen into and from the respective body tissues being different depending on the respective tissues, calculates the respective quantities of nitrogen using data on the saturation half-times, and obtain and display data on non-decompression diving or decompression diving on the basis of the respective quantities of nitrogen and safety limit quantities of nitrogen. Some of these devices display the shortest one of the respective remaining times up to the non-decompression limit for the tissues so as to indicate the non-decompression limit.

If the remaining times up to a non-decompression limit for tissues having short saturation half-times are small and the remaining times up to the non-decompression limit time for tissues having long saturation half-times are yet large, slight ascent serves to prolong the remaining times up to the non-decompression limit for the tissues having short saturation half-times, so that so careful attention is not required to be paid to such remaining times. However, if the remaining times up to the non-decompression limit for all the tissues are short, a danger is pressing and attention is required. The above depth meters only display the shortest remaining time up to the non-decompression limit in any one of two cases where the diver is required to pay careful attention and where the driver is not required to pay careful attention, so that he cannot recognize which of these two cases he is in.

In consideration of these situations, U.S. Pat. Nos. 4,782,338 and 5,049,864 have proposed simultaneous graphic display of quantities of nitrogen in the body tissues. According to this technique, it can be seen whether only a quantity of nitrogen for a specified tissue is large or all the quantities of nitrogen in the body tissues are large. However, the respective remaining times to the non-decompression limit cannot be known from the quantities of nitrogen. Therefore, the diver cannot know the extent to which the remaining time to the non-decompression limit is prolonged if the quantity of nitrogen in the most dangerous tissue is reduced, and the extend to which the remaining time before the non-decompression limit for that tissue is increased.

According to such electronic depth meters, the diver cannot directly know whether the current depth tends to increase or decrease the remaining time before the non-decompression limit, and he is required to wait until he can determine such situation by watching an increase or a decrease in the remaining time up to the non-decompression limit or the quantities of nitrogen actually displayed. Thus, this depth meter is inconvenient to use.

U.S. Pat. Nos. 4,782,338 and 5,049,864 disclose a technique for displaying as to whether the quantities of nitrogen in the body tissues have exceeded the limit value, using a mark indicative of a non-decompression limit value attached to a graphic indicator for the quantities of nitrogen in the body tissues, but it is difficult to understand to what extent the quantities of nitrogen in the tissues are close to, or exceed, the limit value.

SUMMARY OF THE INVENTION

It is an object of the present invention to provide an electronic depth meter which is capable of easily recognizing the remaining time up to a non-decompression limit for body tissues, improving its safety and increasing the diving time.

It is another object of the present invention to provide an electronic depth meter which allows the diver to directly recognize whether the current depth tends to increase or decrease the remaining time up to the non-decompression limit.

It is a further object of the present invention to provide an electronic depth meter which is capable of intelligibly indicating percentages of the current partial pressures of an inert gas in the body tissues to the non-decompression limit value.

In order to achieve the above objects, according to the present invention, there is provided an electronic depth meter comprising:

pressure sensing means for sensing the ambient pressure of the depth meter to generate data representative of the sensed pressure;

diving data generating means for receiving the data representative of the pressure generated from the pressure sensing means to generate data representative of the levels of an inert gas dissolved in a plurality of body tissues under water;

limit value data storage means for storing data representative of respective limit values for the plurality of tissues within which limit values the corresponding tissues can ascend to the surface of water without decompression;

diving data generating means for receiving data representative of the respective levels of an inert gas dissolved in the plurality of tissues from the diving data generating means and data representative of the corresponding limit values from the limit value data storage means to generate data representative of the respective remaining times up to the corresponding limit values at which the respective tissues are required to be decompressed;

display means for simultaneously and graphically displaying data on the respective remaining times for the plurality of tissues generated by the diving data generating means.

According to such construction, the remaining times up to the non-decompression limit for the body tissues are graphically displayed. Therefore, the diver can easily know whether only the remaining time for a specified tissue is small or the remaining times for other tissues are also small to thereby further improve the safety of diving and increase the diving time.

BRIEF DESCRIPTION OF THE DRAWINGS

FIG. 2 shows the structure of a RAM of the FIG. 1 depth meter;

FIG. 3 shows a table of decompression stored in a ROM of the FIG. 1 depth meter;

DESCRIPTION OF THE PREFERRED EMBODIMENTS (I) First Embodiment

Referring to FIGS. 1–12, an electronic depth meter as a first embodiment according to the present invention will be described specifically. The embodiment is the depth meter used for diving made by breathing compressed air containing nitrogen.

Figure 1:
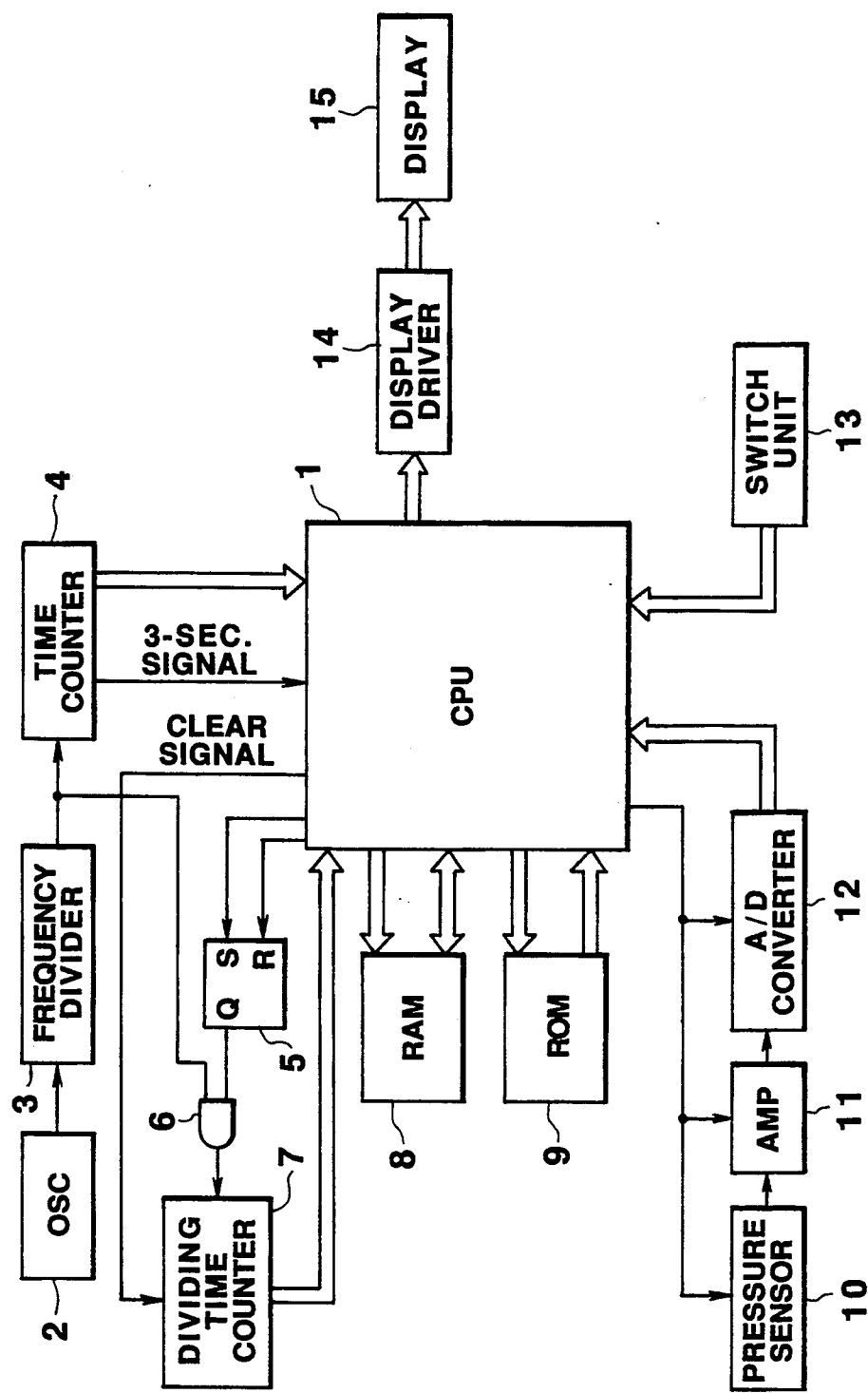
FIG. 1 is a block diagram indicative of the circuit structure of an electronic depth meter as a first embodiment of the present invention.

FIG. 1 is a block diagram indicative of the circuit structure of the electronic depth meter as the first embodiment. The depth meter comprises a CPU 1 as its center and other circuit elements connected to CPU 1. CPU 1 processes received data and sends the resulting data to the respective circuits concerned and also signals to them for controlling purposes. Oscillator 2 normally sends a signal with a constant frequency. Frequency divider 3 changes a signal from oscillator 2 to a signal with a predetermined decreased frequency and delivers the signal to time counter 4 and AND gate 6. Time counter 4 counts signals from frequency divider 3 to obtain the current time and delivers same to CPU 1 and also delivers to CPU 1 a 3-second signal which is a timing signal for measurement of pressure, etc., at intervals of 3 seconds.

When RS flip-flop 5 has received a set or a reset signal from CPU 1, it is set or reset. When it is set, it provided an output Q. AND gate 6 is opened by an output from RS flip-flop 5 and delivers a signal with the predetermined frequency from frequency divider 3 to diving time counter 7, which counts signals with the predetermined frequency from AND gate 6 to measure a lapse time and delivers to CPU 1 the measured lapse time as the diving time. When diving time counter 7 receives a clear signal from CPU 1, it clears the measured lapse time.

RAM 8 has a structure described below. It stores data from CPU 1 and delivers the stored data to CPU 1 under control of CPU 1. FIG. 2 illustrates the structure of RAM 8. Mode register R designates a mode. When 0 is set in the mode register R, a clock mode is designated in which the depth meter is used as a clock. When 1 is set, a depth meter mode is designated in which the depth meter is used as such. When the depth is 1.5 m or more or while substantial diving is being made, 1 is set in diving flag SF. Tissue designating register i designates any one of the tissues of a human body which are given tissue numbers 1-6. For example, when tissue number "2" is set, a tissue having tissue number "2" is designated. To be described later in more detail, the tissues of a human body are classified according to saturation half-time. Shortest non-decompression limit remaining time register TA is one in which the shortest one of the remaining times for the six tissues up to a non-decompression limit is set. Decompression depth register GS is one in which the decompression stop depth of a tissue designated by tissue designating register i is set. Attention tissue register X is one in which the tissue number of a tissue to which a maximum attention should be paid to avoid a decompression sickness or a tissue having a maximum decompression stop depth (when there are two or more tissues having the maximum decompression stop depth, the tissue having the maximum decompression stop time) is set in decompression diving which requires decompression for ascending purposes. Maximum decompression stop depth register SM is one in which the maximum decompression stop depth, or the decompression stop depth of a tissue designated by a tissue number in attention tissue register X, is set. Maximum decompression depth stop time register TM is one in which the maximum decompression stop time at the maximum decompression stop depth, or a decompression stop time of a tissue designated by a tissue number in attention tissue register X, is set.

Data storage DM is a 4-line one having line addresses 1-4. In the line with line address 1, nitrogen partial pressure memories Q1-Q6 are provided which store partial pressures of nitrogen in tissues having tissue numbers 1-6; in the line with line address 2, diving type flags MF1-MF6 are provided which store data on whether the current diving is non-decompression diving (which does not require decompression in ascent) for the respective tissues or decompression diving (0 is stored in the flag in non-decompression diving while 1 is stored in decompression diving). In the line with line address 3, non-decompression limit remaining time memories MT1-MT6 are provided which store the respective remaining times up to the non-decompression limit when the respective tissues are for non-decompression diving; and in the line with line address 4, decompression time memories GT1-GT6 are provided which store the respective decompression times when decompression diving is for the respective tissues.

ROM 9 fixedly stores programs for various processing operations as the electronic depth meter and data on a safety permissible limit quantity of nitrogen when the diver ascends and delivers these data to CPU 1 under control of same. The safety permissible limit quantities of nitrogen stored in ROM 9 are, for example, M values for the respective tissues of a human body classified according to saturation half-time on a table of decompression used in the U.S. Navy, as shown partially in FIG. 3 (in which, for example, a tissue having tissue number "2" is indicated as M-2). The M value is a permissible partial pressure of nitrogen which can safely be dissolved into each of the tissues of a human body if the ascending speed is within a predetermined one, and those M values are stored at intervals of a depth of 10 feet (in FIG. 3, for example, the M value at a depth of 10 feet is represented as M(10)). That is, if the partial pressure of nitrogen in a particular tissue exceeds the M value at a predetermined depth for that tissue by diving, the diver must stay at that depth until the partial of nitrogen becomes a value of less than the M value.

Pressure sensor 10, amplifier 11 and A/D converter 12 are started up by a start-up signal from CPU 1. Pressure sensor 10 delivers to amplifier 11 an analog electrical signal indicative of the ambient pressure which is the sum of the atmospheric pressure and water pressure. Amplifier 11 amplifies this electrical signal and delivers the resulting signal to A/D converter 12, which converts the received signal to a digital electrical signal and delivers same to CPU 1. Switch unit 13 is provided with various switches. When any one of these switches is depressed, it delivers to CPU 1 a signal indicative of this depression.

Figure 9:
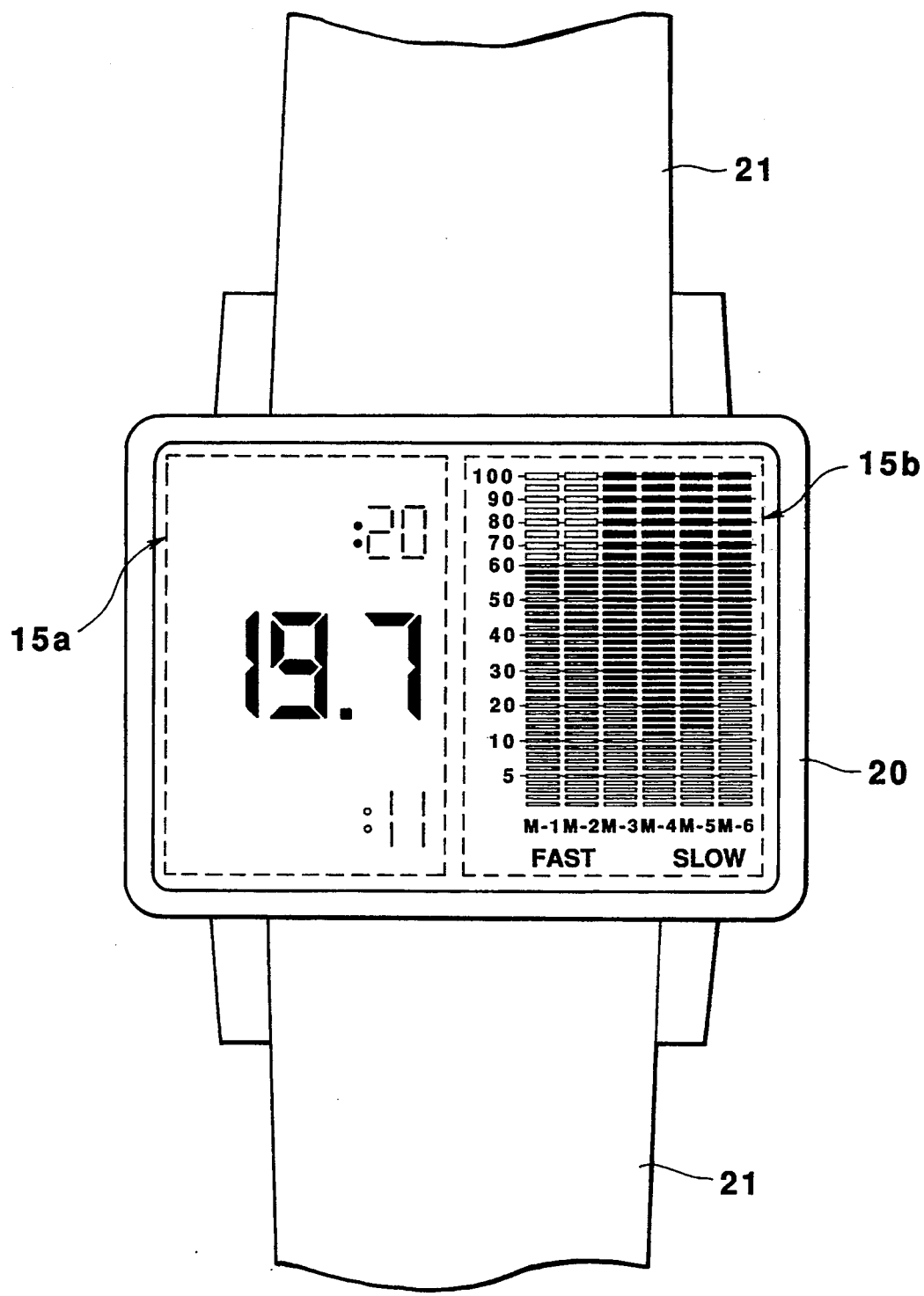
FIG. 9 illustrates a display on a display of the electronic depth meter of the first embodiment when non-decompression diving is performed.

Display driver 14 drives display 15 and displays various data from CPU 1 on display 15, which, as shown in FIG. 9, is composed of a digital display 15a which displays a depth, etc., digitally and a graphic display 15b which displays a non-decompression limit remaining time, etc., in a graphic form. Graphic display 15b is provided with six bar graphic display segments and has character display segments M-1, M-2, ..., M-6 indicative of the respective tissues below the bar graphic segments. Time scales 5, 10, 20, ..., 100 are printed in units of a minute along the vertical axis of the bar graphs on the left of the graphic display 15b.

The depth meter of this embodiment takes the form of a wrist watch, as shown in FIG. 9, and has a pair of bands for being attached to a wrist of the diver at 12 and 6 o'clock on its case 20.

Figure 4:
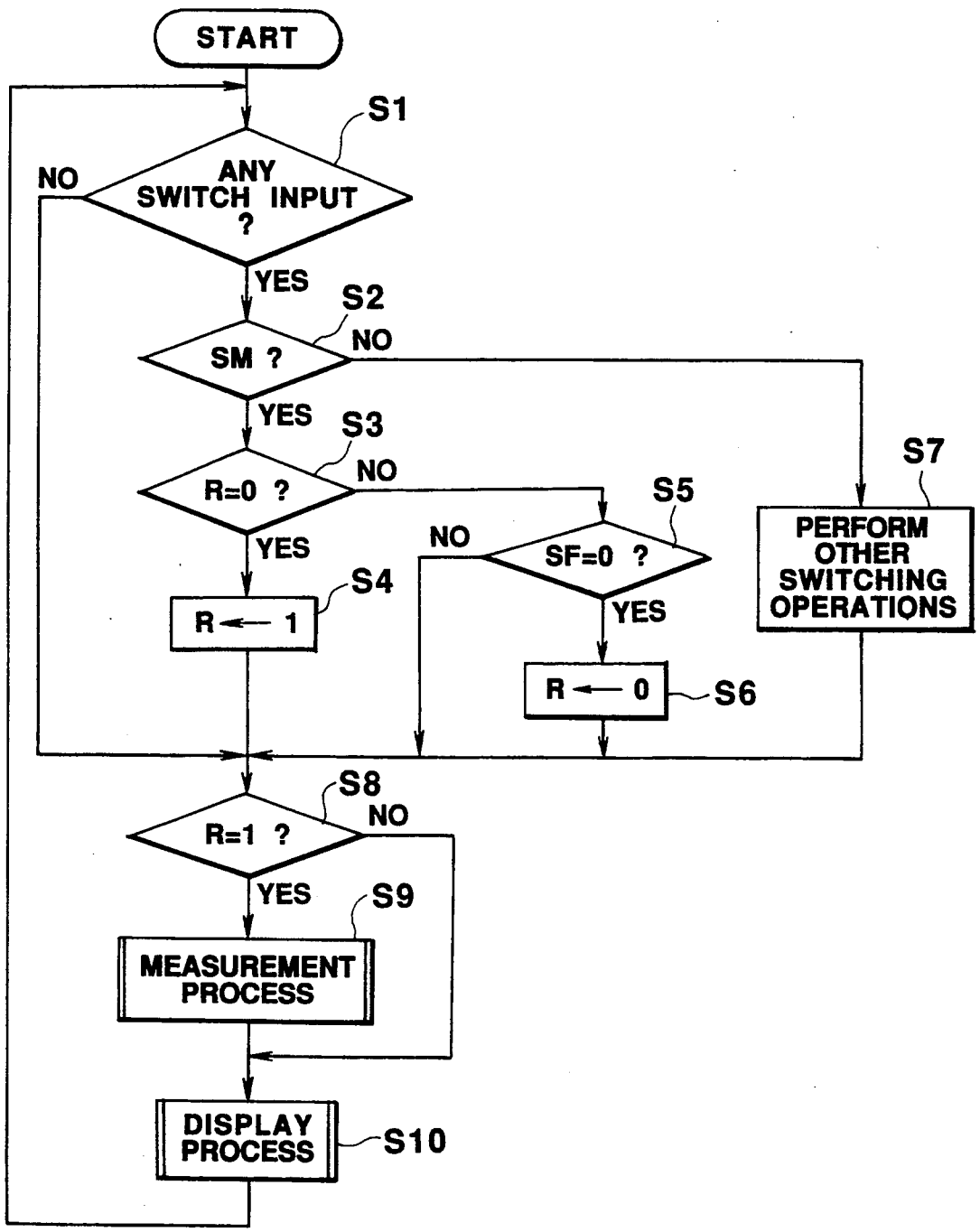
FIG. 4 general flowchart indicative of the outline of the operation of the FIG. 1 circuit.

The operation of the first embodiment will be described next. FIG. 4 is a general flowchart indicative of the outline of the operation of this embodiment. At step S1, it is determined whether any one of the switches of switch unit 13 is depressed and a signal indicative of that depression is received. If not, control passes directly to step S8. Otherwise, control passes to step S2, where it is determined that the depressed switch is not mode switch SM. If so, control passes to step S7, where a switching process is performed in accordance with the received signal indicative of that depression of the switch. Then, control passes to step S8. When it is determined at step S2 that the depressed switch is mode switch SM, control passes to step S3 where it is determined whether the value of mode register R is 0 and whether the mode is a clock mode. If so, control passes to step S4, where the value of mode register R is set at 1 and a depth meter mode is designated. Then, control passes to step S8.

When it is determined at step S3 that the value of mode register R is not 0 but 1 and the depth meter mode is designated, control passes to step S5, where it is determined whether in-diving flag SF is 0, that is, no diving is in progress. If so, at step S6, 0 is set in mode register R, the clock mode is designated and then control passes to step S8. However, when it is determined at step S5 that the value of diving flag SF is 1 and diving is in progress, control passes directly from step S5 to step S8.

At step S8 it is checked whether the value of mode register R is 1 and the depth meter mode is designated. If so, control passes to step S9, where a measurement process to be described later in more detail is executed. When the measurement process at step S9 is completed or it is determined at step S8 that the value of mode register R is not 1 but 0, control passes to step S10, where a display process in which various data is displayed is executed. Control then returns to step S1.

Figure 5:
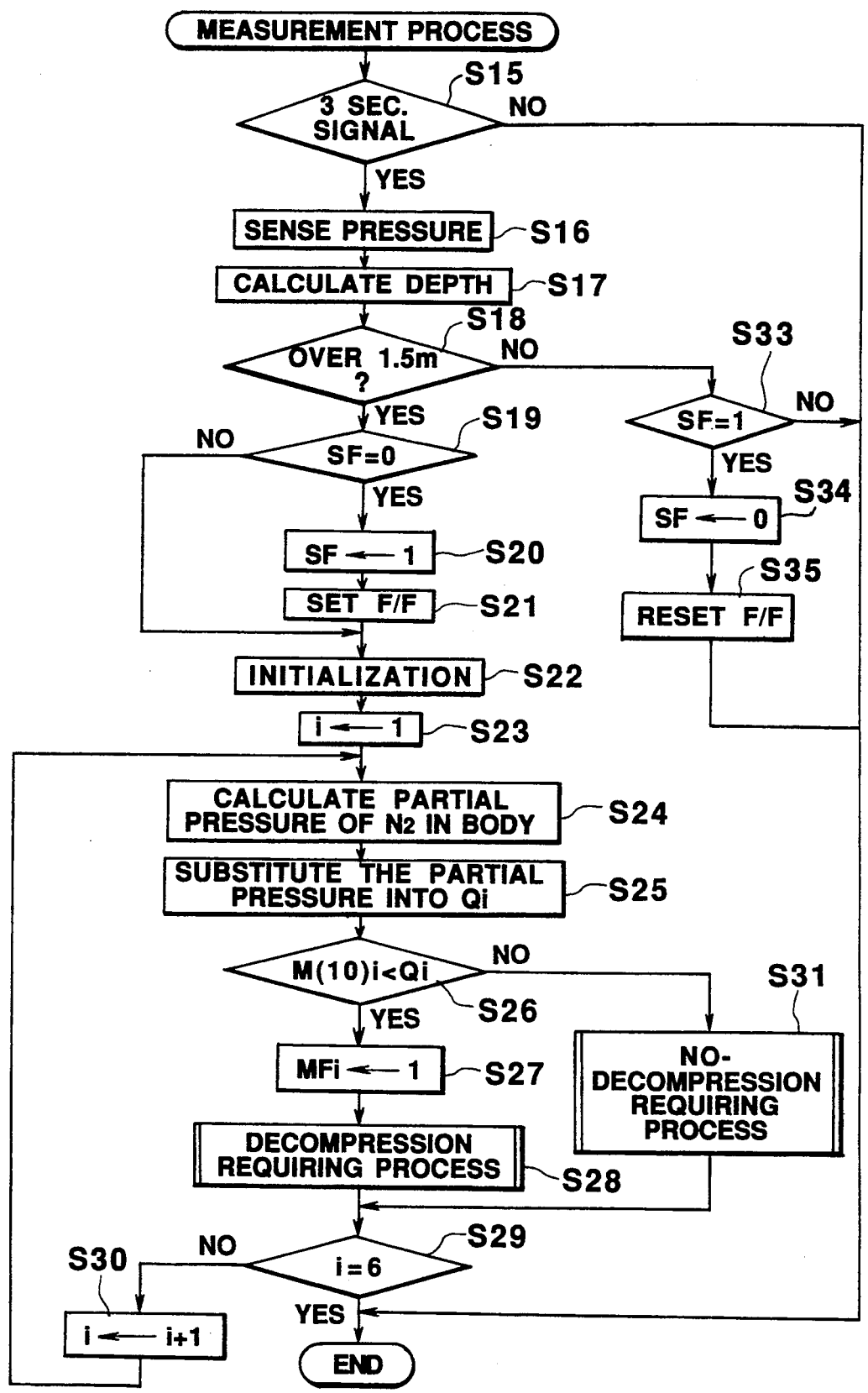
FIG. 5 is a flowchart indicative of the details of the measuring process of the FIG. 4 flow.

FIG. 5 is a flowchart indicative of the details of the measurement process at step S9 of FIG. 4. In the measurement process, at step S15 it is determined whether a 3-second signal which is output at intervals of 3 seconds from time counter 4 has been received. If not, the measurement process is terminated. Otherwise, control passes to step S16, where a start-up signal is delivered to pressure sensor 10, amplifier 11 and A/D converter 12. Thus, the pressure is detected. At step S17 the depth is calculated on the basis of the detected pressure. The calculation of the depth in this case obeys any method of calculation used conventionally in the depth meters.

After the calculation of the depth, it is determined at step S18 whether the calculated depth is 1.5 m or more. If it is determined that the depth is 1.5 m or more and diving is in progress, control passes to S19 where it is determined whether the value of diving flag SF is 0. If so, the value of in-diving flag SF is set at 1 and data on the start of diving is stored at step S20. At step S21 a set signal is delivered to RS flip-flop 5 to set same and hence open AND gate 6, so that a signal having a predetermined frequency is delivered from frequency divider 3 to diving time counter 7, which starts the measurement of the diving time. When the processing at step S21 is completed, or when it is determined at step S19 that the value of diving flag SF is not 0 but 1, control passes to step S22, where initialization is executed for shortest non-depression limit remaining time register TA, deepest depression depth register SM, deepest depression depth stop time register TM and diving type flags MF1–MF6 in RAM 8. At step S23, tissue designating register i is set at 1 and the tissue having tissue number 1 (or the tissue displayed as M−1 on graphic display 15) is designated.

After the tissue having tissue number 1 is designated, control passes to step S24, where the partial pressure of nitrogen in the tissue designated by tissue designating register i (in this case, the tissue having tissue number 1) is calculated in accordance with the following:

$$Qi = Pi + (N - Pi)(1 - 0.5^{(T/Hi)}) \quad (1)$$

where i is the value of tissue designating register i and is data on the tissue designated by tissue designating register i. In the present embodiment, the value i takes i=1, 2, . . . ,6; Qi is the current partial pressure (bar) of nitrogen in the tissue having tissue number i; Pi the partial pressure of nitrogen (bar) in the tissue having tissue number i which pressure present T (minutes) ago; N is the partial pressure (bar) of nitrogen in the breathed gas under the current ambient pressure; and Hi is a saturation half-time (minutes) of the tissue having tissue number i. Since measurement is performed at intervals of 3 seconds after reception of a 3-second signal, as mentioned above (see step S15), Pi represents the partial pressure of nitrogen in the appropriate tissue 3 seconds ago. The partial pressure N of nitrogen of the breathed gas under the current ambient pressure is obtained by multiplying the current ambient pressure (atmospheric pressure+water pressure) by the percentage of nitrogen in the breathed gas.

After the processing at step S24 is completed, control passes to step S25, where data on the partial pressure of nitrogen in the tissue having tissue number 1 calculated at step S24 is set in the nitrogen partial pressure memory designated by tissue designating register i and, in this case, nitrogen partial pressure memory Q1. Then, it is checked at step S26 whether the nitrogen partial pressure of the tissue having tissue number 1, the data on of which pressure is set in nitrogen partial pressure memory Q1, is larger than the M value or 3.606 bar (see FIG. 3) of the tissue having tissue number 1 at a depth of 10 feet. If not, control passes to step S31, where a no decompression requiring process, to be described in more detail later, is performed and then control passes to step S29. When at step S26 the partial pressure of nitrogen in the tissue having tissue number 1 is determined to be larger, control passes to step 527, where a diving type flag designated by tissue designating register i, in this case, diving type flag MF1, is set at 1 and data on the requirement of decompression is stored for at least the tissue having tissue number 1. At step S28 the decompression-requiring process, to be described later in more detail, is executed. Then, control passes to step S29, where it is determined whether the value of tissue designating register i is 6. In this case, the value of tissue designating register i is 1 and not 6, so that control passes to step S30 and the value of tissue designating register i is incremented by one into 2. Control then returns to step S24. The processing at steps S24–S30 is then repeated and similar processing is performed for the respective tissues having tissue numbers 2–6. When the processing for the tissue having tissue number 6 has been completed, this fact is detected at step S29 from the fact that the value of tissue designating register i is 6. After this measurement process is completed, control passes to the display process of FIG. 4 (step S10).

When it is determined at step S18 of FIG. 5 that the depth is less than 1.5 m, it is determined that the diver has ascended to the surface of the water and control passes to step S33, where it is determined whether diving flag SF is 1. When in-diving flag SF is 1, control passes to step S34, where diving flag SF is set at 0. At step S35, a reset signal is delivered RS flip-flop 5 to reset same and the counting of the diving time by diving time counter 7 is stopped.

Figure 6:
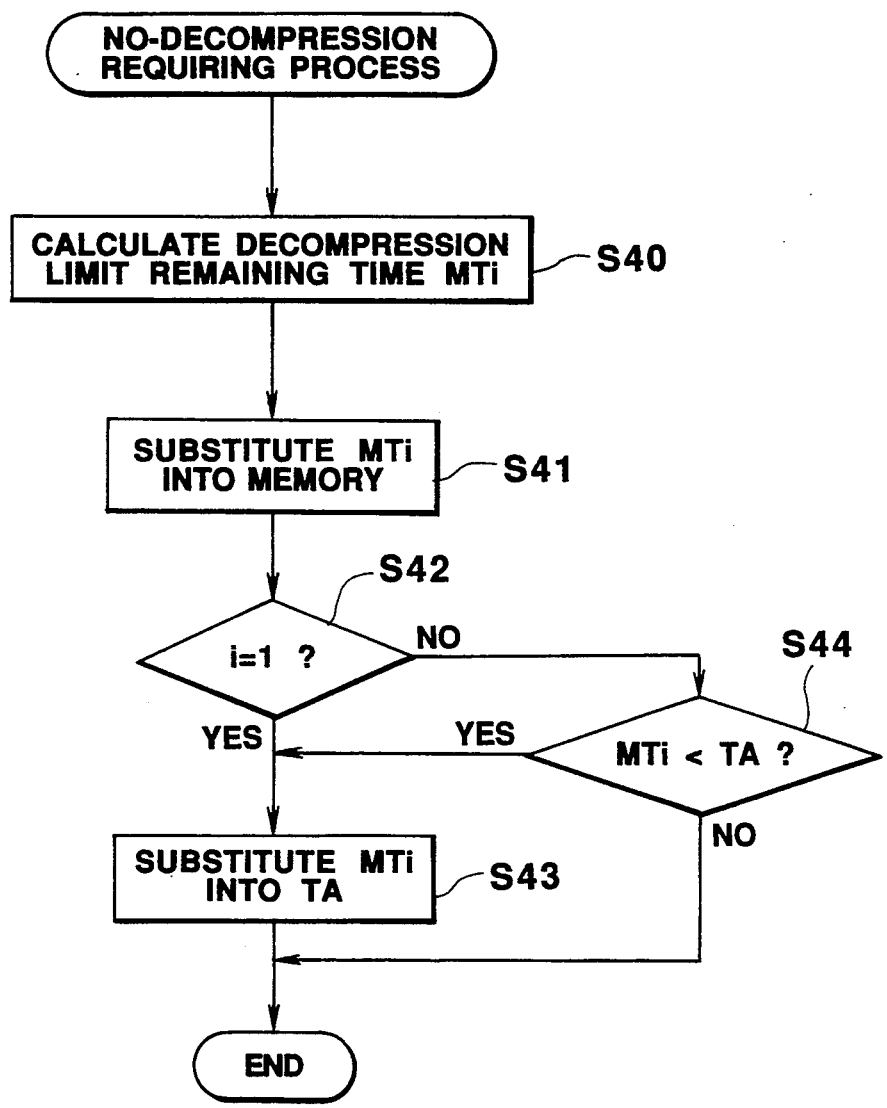
FIG. 6 is a flowchart indicative of the details of a no-decompression requiring process (performed when no decompression is required) in the FIG. 5 flow.

FIG. 6 is a flowchart indicative of the details of a no-decompression requiring process (step S31) in the measurement process (FIG. 5). In this process, first, at step S40 a non-decompression limit remaining time MT i (the remaining time up to the limit time in which the diver can directly ascend without requiring decompression, as mentioned above, that is, the time interval from the time when the driver saw the time MTi to a time when the partial pressure of nitrogen in that tissue exceeds the M value or M(10)i at a depth of 10 feet) for the tissue designated by tissue designating register i is calculated. In this case, the non-decompression limit remaining the MT i is calculated by $$MTi = Hi \times \log \{(N - M(10)i)/(N - Qi)\}/\log 2 \qquad (2)$$

This expression (2) is obtained by replacing Qi with M(10−)i; T with MTi; and Pi with Qi in substantially the same expression as expression (1) and then solving the resulting expression with reference to MTi.

After non-decompression limit remaining time MTi is calculated at step S40, control passes to step S41, where the calculated non-decompression limit remaining time MTi is stored in the one of non-decompression limit remaining time memories MT1–MT6 of RAM8 designated by tissue designating register i, that is, non-decompression limit remaining time memory MTi. Then, at step S42 it is determined whether the value of tissue designating register i is 1. If so, control passes to step S43, where data on the non-decompression limit remaining time stored in non-decompression limit remaining time memory MT1 at step S41 is set in the shortest non-decompression limit remaining time register TA of RAM 8. When the value of tissue designating register i is determined to be not 1 at step S42, control passes to step S44, where it is determined whether the non-decompression limit remaining time whose data is stored in non-decompression limit remaining time memory MTi is shorter than the non-decompression limit remaining time whose data is transferred to and stored in the shortest non-decompression limit remaining time register TA (the non-decompression limit remaining times for other tissues). If so, control passes to step S43, where the shorter non-decompression limit remaining time or data on the non-decompression limit remaining time stored in non-decompression limit remaining time memory MTi at step S41 is set in shortest non-decompression limit remaining time register TA. As described above, in this no-decompression requiring process, a non-decompression limit remaining time for a tissue which requires no-decompression is calculated while a non-decompression limit remaining time for the tissue having the shortest non-decompression limit remaining time is being searched, and data on the searched remaining time is set in the shortest non-decompression limit remaining time register TA.

Figure 7:
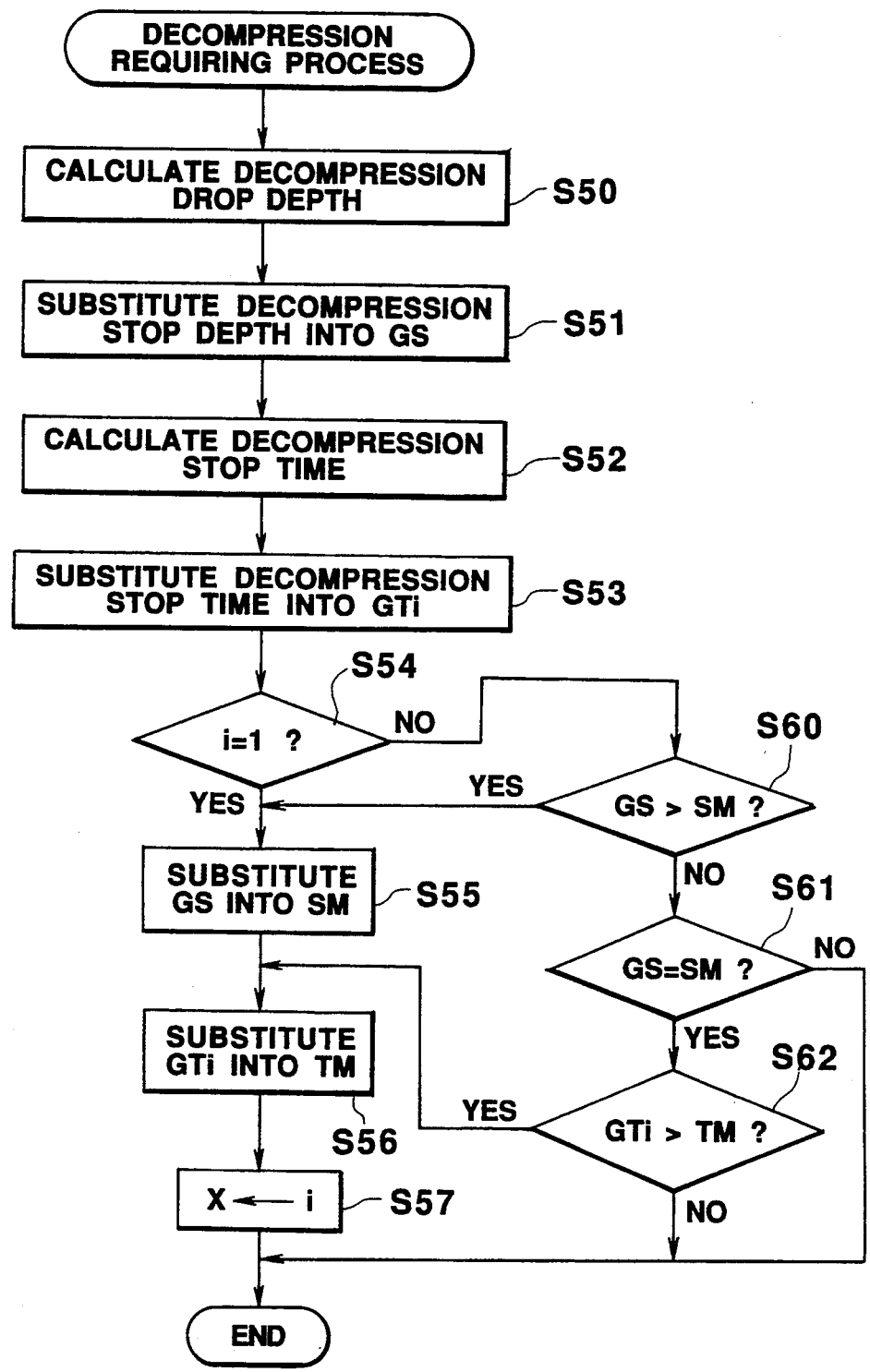
FIG. 7 is a flowchart indicative of the details of a decompression requiring process performed when decompression is required) in the FIG. 5 flow.

FIG. 7 is a flowchart indicative of the details of the decompression requiring process (step S28) in the measurement process (FIG. 5). In this process, the decompression stop depth is first obtained at step S50. In this case, data on the partial pressure of nitrogen stored in nitrogen partial pressure memory Qi of nitrogen partial pressure memories Q1–Q6 and designated by tissue designating register i is sequentially compared with the M value at a depth of 20 feet (that is, M(20)i), the M value at a depth of 30 feet (that is, M(30)i), . . . to obtain the largest M value (among M(10)i, M(20)i, M(30)i, M(40)i, . . .) which does not exceed the partial pressure of nitrogen whose data is stored in nitrogen partial pressure memory Qi, and the depth for the obtained M value is used as a decompression stop depth. Then, at step S51, data on the decompression stop depth obtained at step S50 is set in decompression depth register GS of RAM 8. At step S52 decompression stop time GTi at the decompression stop depth is calculated by $$GTi = -Hi \times \log \{(N - M(x)i)/(N - Qi)\}/\log 2 \qquad (3)$$

This expression (3) is essentially the same as expression (2), and M(x)i is an M value corresponding to the decompression depth.

After the processing at step S52 is completed, control passes to step S53, where data on the decompression stop time calculated at step 52 is stored in that of decompression time memories GT1–GT6 designated by tissue designating register i, that is, decompression time memory GTi. Then, at step S54 it is determined whether the value of tissue designating register i is 1. If so, control passes to step S55, where data on the decompression stop depth set in decompression depth register GS at step S51 is set in deepest decompression depth register SM. At step S56 data on the decompression stop time stored in decompression time memory GTi, that is, data on GT1, at step S53 is set in deepest decompression depth stop time register TM. At step S57 the value of 1 in tissue designating register i is set in attention tissue register X to thereby store data on the fact that data on the decompression stop time set in deepest decompression depth stop time register TM is for the tissue having tissue number 1.

When it is determined at step S54 that the value of tissue designating register i is not 1, control passes to step S60, where it is determined whether the decompression stop depth calculated this time and set in decompression depth register GS is larger than the decompression stop depth for the other tissues calculated already and whose data is set in deepest decompression depth register SM. If so, control passes to step S55, where data on the decompression stop depth in decompression stop depth register GS is stored in deepest decompression depth register SM. At step S56 data on the decompression stop time calculated this time and stored in decompression time memory GTi is stored in deepest decompression depth stop time register TM and at step S57 data on the value of tissue designating register i at that time is set in attention tissue register X. When it is determined at step S60 that the decompression stop depth calculated this time and whose data is set in decompression depth register GS is not larger than that for the other tissues set in deepest decompression depth register SM, control passes to step S61, where it is determined whether both the decompression depths whose data are stored in decompression depth register GS and deepest decompression depth register SM are equal to each other. If so, control passes to step S62, where it is determined whether the decompression stop time calculated this time and whose data is stored in decompression time memory GTi is larger than the decompression stop time calculated already and whose data is set in deepest decompression depth stop time register TM. If so, control passes to step S5, where data on the longer decompression stop time stored in decompression time memory GTi in consideration of safety is stored in deepest decompression depth stop time register TM. At step S57 data on the value of tissue designating register i at that time is set in attention tissue register X to store the tissue number for the tissue involved in the deepest decompression stop time whose data is stored in deepest decompression depth stop time register TM. As described above, when a tissue which requires decompression is found in the decompression requiring process, a decompression stop depth and a decompression stop time necessary for each tissue are sought and data on the deepest decompression depth is set in deepest decompression depth register SM, data on the decompression stop time at that decompression stop depth (when the decompression stop depths for two or more tissues are equal to each other, and they are the deepest decompression stop depths, the longer one of those decompression stop times) is set in deepest decompression depth stop time register TM, and data on the tissue number of the tissue for the decompression stop time whose data is set in deepest decompression depth stop time register TM is set in attention tissue register X.

Figure 8:
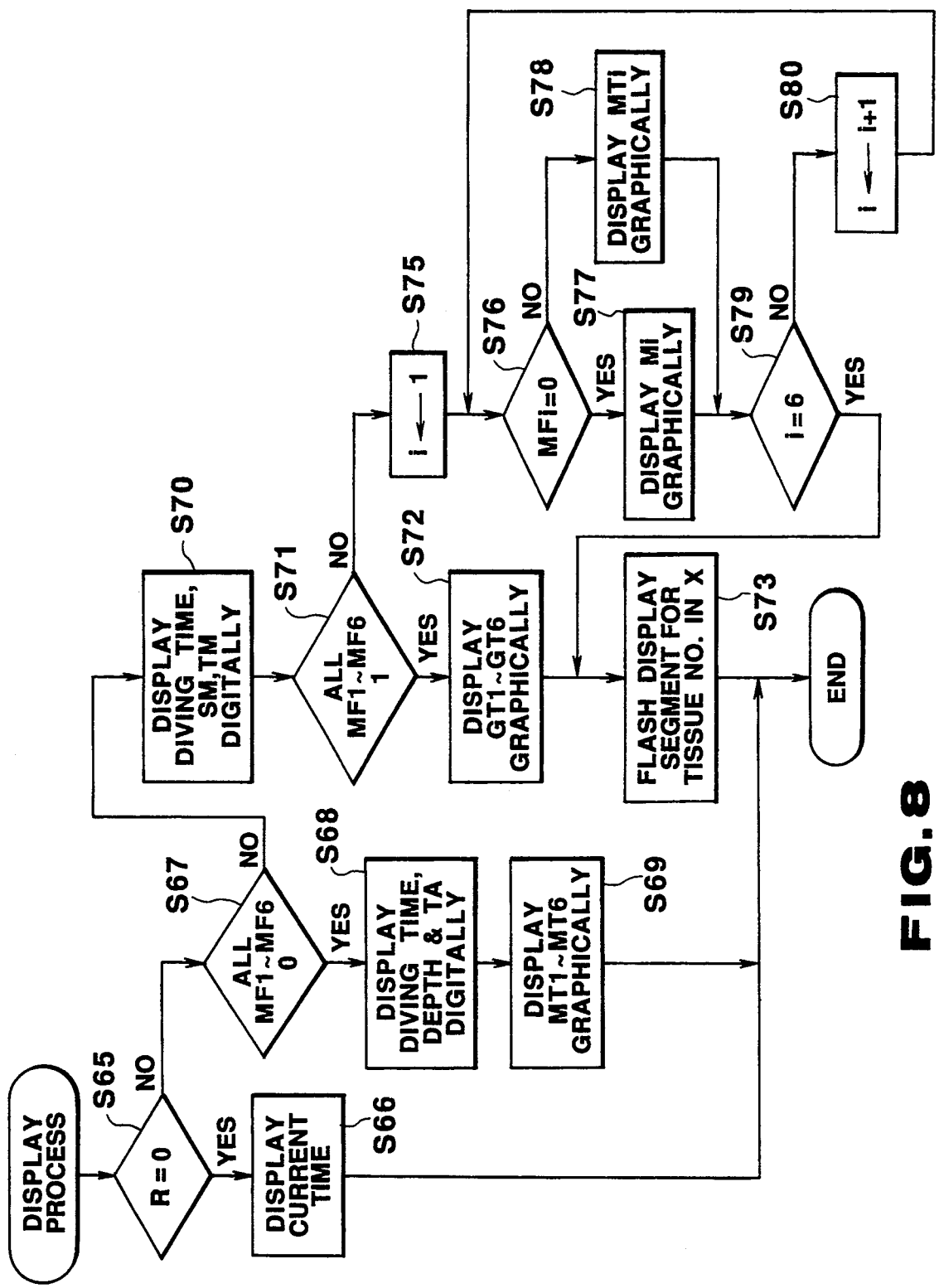
FIG. 8 is a flowchart indicative of the details of the display process in the FIG. 4 flow.
Figure 10:
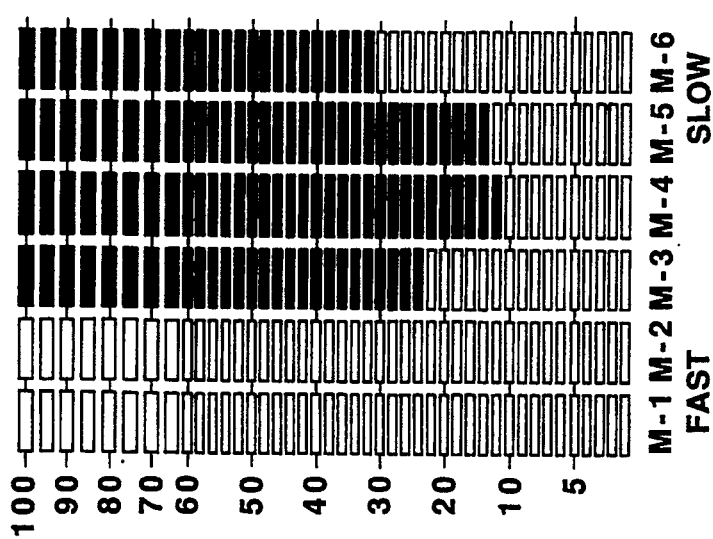
FIG. 10 shows a display on a graphic display of FIG. 9 on enlarged scale.

FIG. 8 is a flowchart indicative of the details of the display process (step S10) of FIG. 4. In this process, first it is determined at step S65 whether the value of mode register R is 0 and the clock mode is employed. If so, control passes to step S66, where the current time from time counter 4 is displayed on liquid crystal display panel 15a of display 15. When it is determined at step S65 that the value of mode register R is not 0 but 1 and the depth meter mode is used, control passes to step S67, where it is determined whether 0 is set in all diving type flags MF1–MF6 and hence whether no decompression is required for any of the tissues. If so, at step S67, control passes to step S68, where data on the diving time from diving time counter 7, the depth calculated at step S17 of FIG. 5, and the shortest non-decompression limit remaining time whose data is set in shortest non-decompression limit remaining time register TA are displayed on digital display 15a. For example, if the diving time is 20 minutes; the depth is 19.7 m; and the shortest non-decompression limit remaining time is 11 minutes, the digital display is as shown in FIG. 9. Then, at step S69, as shown in FIG. 9, data on the non-decompression limit remaining times for the respective tissues stored in non-decompression limit remaining time memories MT1–MT6 are displayed on graphic display 15b in the form of a bar graph and character display segments (indicative of the tissues having tissue numbers "1", "2", "3", . . . "6", as shown before) of M−1, M−2, M−3, . . . ,M−6 provided below the corresponding bar graph display segments are lighted for displaying purposes. FIG. 10 illustrates a display on graphic display 15b on enlarged scale. In this display, the non-decompression limit remaining times for the tissues having tissue numbers "1" and "2" are 10 minutes or more while the non-decompression limit remaining times for the tissues having tissue numbers "3", "4", "5" and "6" are 22, 10, 12 and 30 minutes, respectively.

Figure 11:
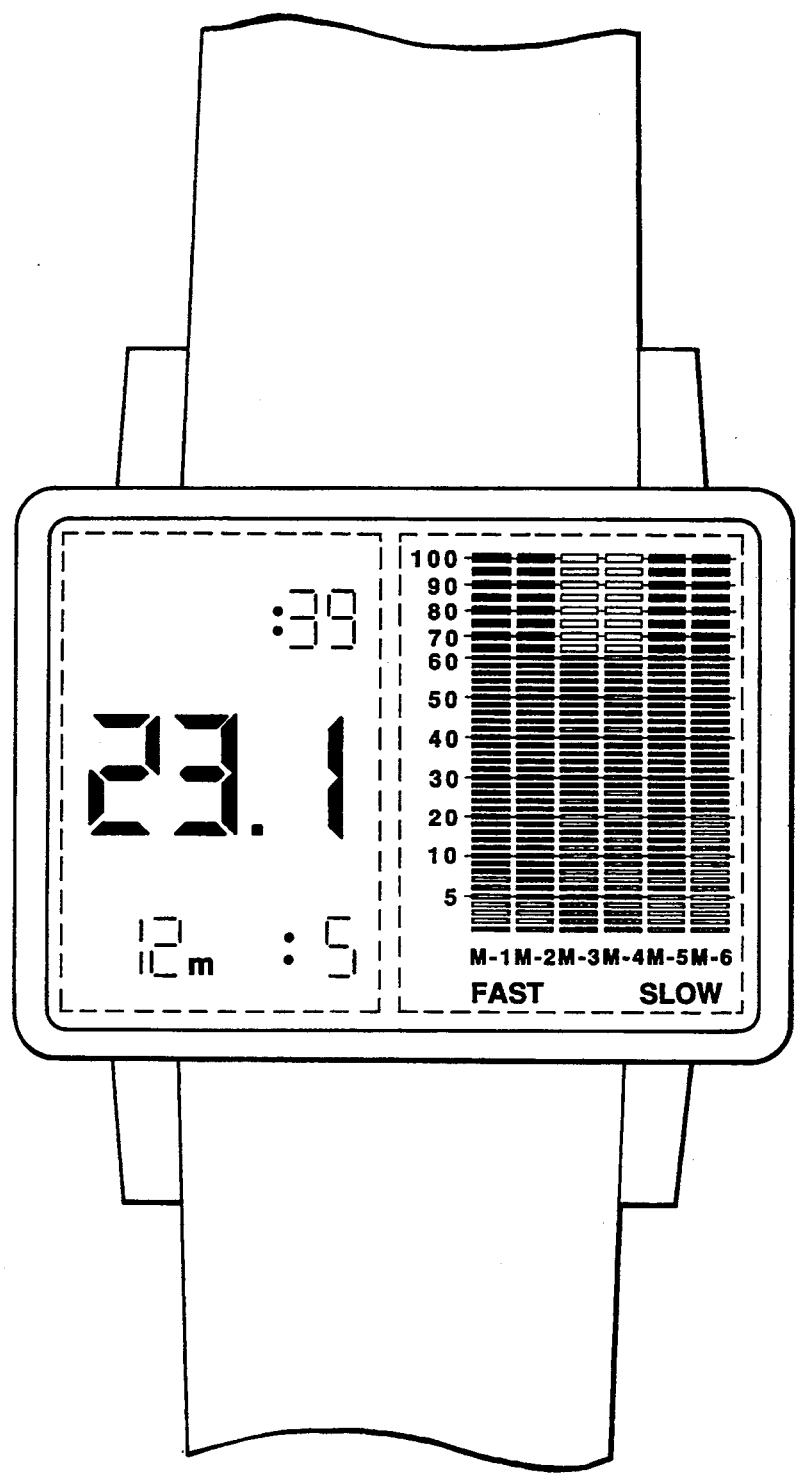
FIG. 11 illustrates a display in a display of the depth meter of the first embodiment when decompression diving is in progress.

When it is determined at step S67 of FIG. 8 that 0 is not set in all diving type flags MF1–MF6, control passes to step S70, where data on the diving time from diving time counter 7, the depth calculated at step S17 of FIG. 5, the deepest decompression depth in deepest decompression depth register SM, and deepest decompression depth stop time in deepest decompression depth stop time register TM are displayed in display segments on digital display 15a (the deepest decompression depth is reduced to one expressed in meters). For example, when the diving time is 39 minutes; the depth is 23.1 m; the deepest decompression depth is 12 m; and the stop time at the deepest decompression depth is 5 minutes, the digital display is as shown in FIG. 11. It is then determined at step S71 whether 1 is set in all diving type flags MF1–MF6 or all the tissues require decompression. When it is determined that 1 is not set in all diving type flags MF1–MF6 or 0 is set in some of the flags and any one of the tissues requires no decompression, control passes to step S75, where 1 is set in tissue designating register i. It is determined at step S76 whether the value of diving flag MFi designated by tissue designating register i, that is, in this case the value of diving type flag MF1 for the tissue having tissue number 1, is 0. If the value is 0 and no decompression is required, control passes to step S77, where the non-decompression limit remaining time in non-decompression limit remaining time memory MT1 is displayed in the lighted leftmost bar graph display segments on graphic display 15b and character display segments for M−1 below the bar graph segments are also lighted. If it is determined at step S76 that the value of diving type flag MF1 is not 0 but 1 and the tissue requires decompression, control passes to step S78, where the decompression time in decompression time memory GT1 is displayed in a flashing manner in the leftmost bar graphic display segments on graphic display 15b and the character display segments for M−1 below that bar graph display segment are lighted. After the processing at steps S77 and S78 is completed, it is determined at step S79 whether the value of tissue designating register i is 6 or the graphic display for all the tissues has been completed. If i is 1, the value of tissue designating register i is incremented by one into 2 at step S80 and then control returns to step S76. Thereafter, by repeating similar processes, non-decompression limit remaining times or decompression times for the tissues having tissue numbers "2", "3", . . . , "6" are sequentially displayed in graphic form and character display segments M−2, M−3, . . . M−6 are sequentially lighted. When graphic display such as that mentioned above is completed for all the tissues, this fact is detected at step S79. Then, control passes to S73, where character display segments (M−1, M−2 . . . ) which display tissues having tissue numbers whose data is set in attention tissue register X or tissues which require decompression and having the deepest decompression stop depth (when the decompression stop depths for two or more tissues are equal and deepest, the tissue having a longer stop time) are displayed in a flashing manner.

Figure 12:
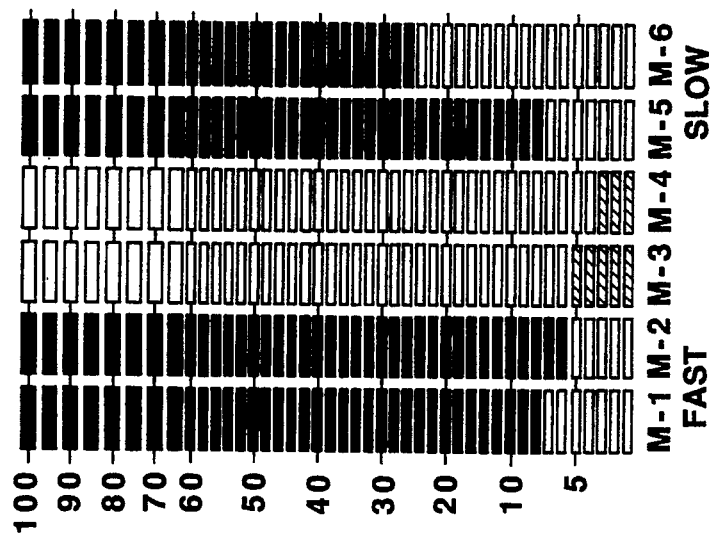
FIG. 12 shows a display on a graphic display of FIG. 11 in enlarged scale.

When, for example, the tissues having tissue numbers "1", "2", "5", "6" require no decompression; their non-decompression limit remaining times are "7", "5", "7", and "22" minutes, respectively, while tissues having tissue numbers "3", "4" require decompression; and their decompression times are 5 and 3 minutes, respectively, display on the graphic display 15b is as shown in FIG. 11. FIG. 12 shows that display on an enlarged scale (in both FIGS. 11 and 12, the bar graph displays segments for the tissues having tissue number "3", "4" are illustrated as hatched, which shows a flashing display). While not shown in both in FIGS. 11 and 12, any one of character display segments M−3 and M−4, that is, character display segments indicative of a tissue having a larger decompression stop depth are displayed in a flashing manner as described above.

When it is determined at step S71 of FIG. 8 that 1 is set in all diving type flags MF–MF6, or that decompression is required for all the tissues, control passes to step S72, where data on the respective decompression times for the tissues stored in decompression time memories GT1–GT6 is displayed in a flashing manner by corresponding bar graphic display segments on graphic display 15b and character display segments M−1, M−2, . . . M−6 are displayed in a lighting manner. Then, at step S73 only character display segments indicative of tissues having tissue numbers whose data is set in attention tissue register X are switched so as to be displayed in a flashing manner.

While in the above embodiment the partial pressures of nitrogen for the respective tissues are obtained since the depth meter used for diving is one which uses compressed air containing nitrogen, the respective partial pressures of an inert gas such as helium other than nitrogen are required to be calculated as in the case of the partial pressure of nitrogen when compressed air containing such inert gas is used.

As described above in detail, since the electronic depth meter of this first embodiment displays concurrently in a graphic manner the shortest non-decompression limit remaining time as well as the non-decompression limit remaining times of tissues classified according to satiation half-time, an electronic depth meter of a multi-level type is provided which brings about easy recognition as to whether only the non-decompression limit remaining time of a specified tissue is short or the other non-decompression limit remaining times for other tissues are also uniformly short.

(II) Second Embodiment

FIGS. 13–18 show a second embodiment of the inventive electronic depth meter which displays the shortest one of non-decompression limit remaining times among tissues and those shortest times, and also displays whether and that the partial pressures of nitrogen in those tissues having the shortest non-decompression limit remaining time are increasing or decreasing.

The circuit structure of this electronic depth meter is the same as that of the electronic depth meter of the first embodiment shown in FIG. 1, and further description thereof will be omitted.

In addition to the register of the first embodiment, RAM 8 includes a non-decompression diving attention tissue register Y in which the tissue number of the tissue having the shortest non-decompression limit remaining time or the tissue to which a maximum attention should be given in the diving which requires no decompression is set. ROM 9 stores a table of decompression which is the same as that in the first embodiment.

Figure 13:
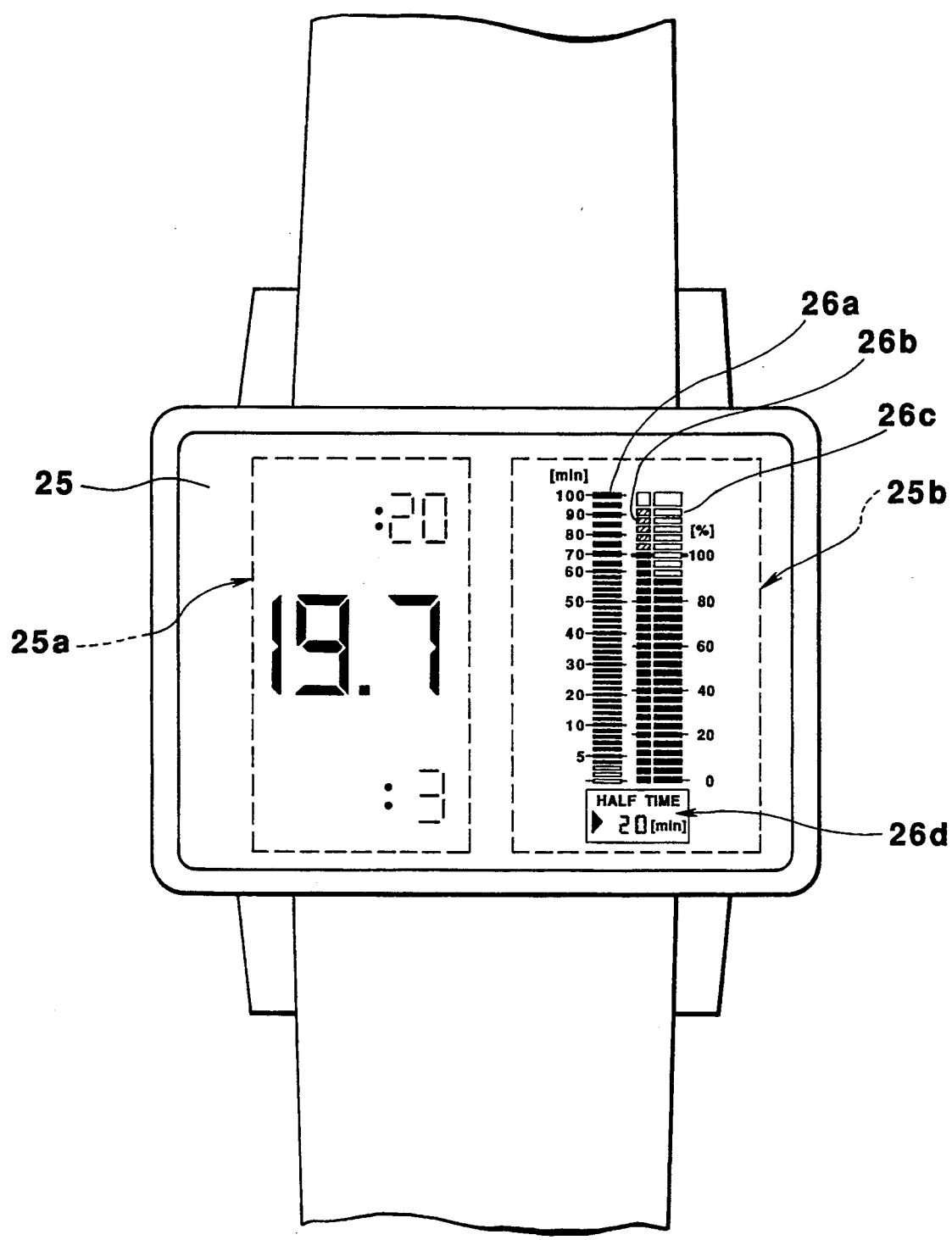
FIG. 13 shows a non-decompression diving display of the electronic depth meter as a second embodiment according to the present invention.

FIG. 13 shows the appearance of the electronic depth meter of the second embodiment. Display 25 is provided with a digital display 25a which displays a depth digitally, and a graphic display 25b which displays a non-decompression limit remaining time graphically. Graphic display 25b has bar-graph display segments 26a–26b and a saturation half-time display 26d provided below the bar graphic display segments 26a–26c for displaying a saturation half-time of a tissue having a tissue number whose data is set in non-decompression diving attention tissue register Y or decompression diving attention tissue register X. Time scales "5", "10", "20", ..., "100" in units of a minute and percent scales "0", "20", "40", ... "100" are printed and displayed vertically on the left and right sides of the overall bar graph in the graphic display 25b.

The operation of the present embodiment will be described below. Since the general flowchart, and the respective flows in the measurement process and the decompression requiring process are the same as those in the first embodiment, further description thereof will be omitted.

Figure 14:
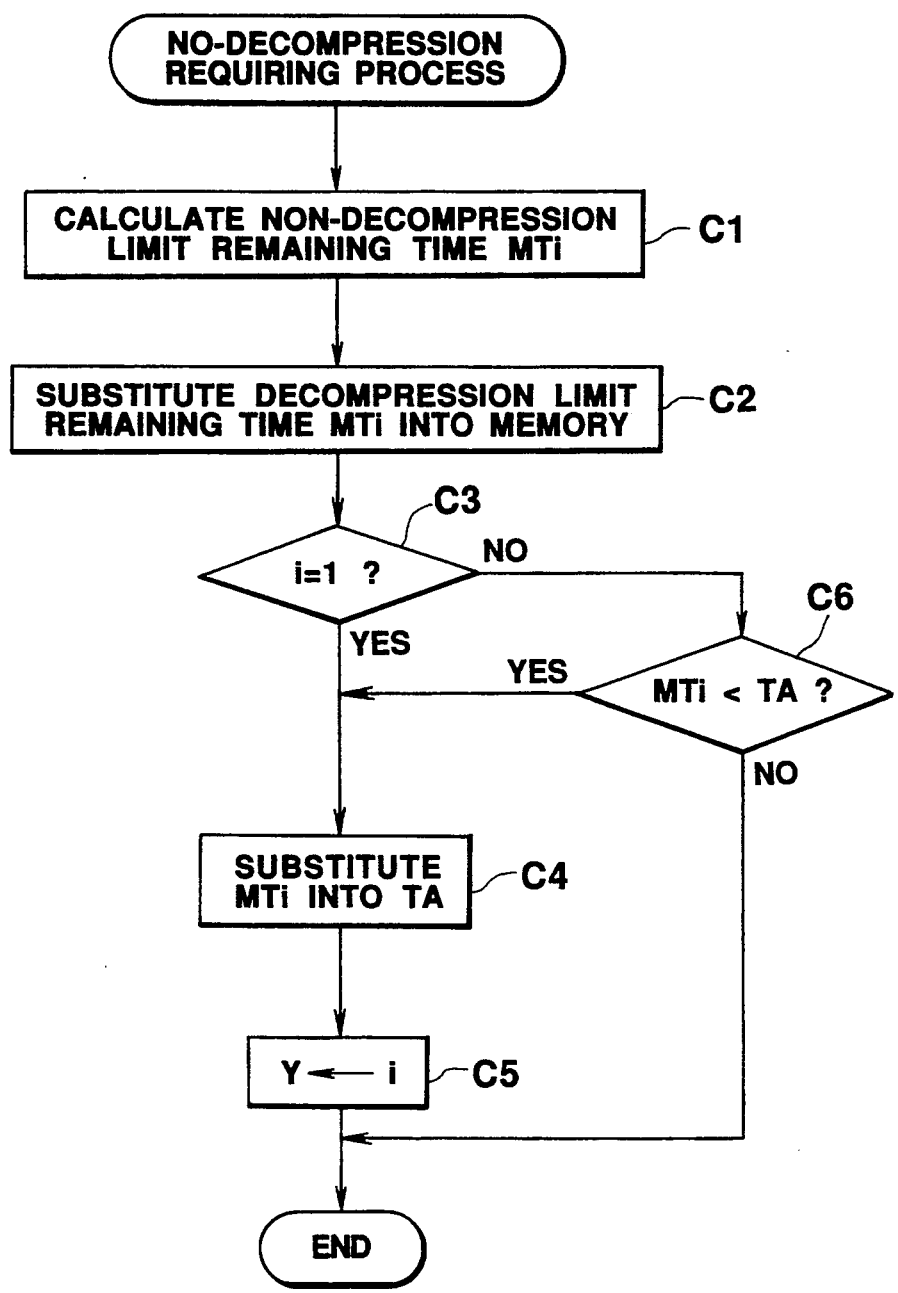
FIG. 14 is a flowchart indicative of the details of the decompression requiring process performed by the depth meter of the second embodiment.

FIG. 14 is a flowchart indicative of the details the no-decompression requiring process. The different points in no-decompression requiring process between the second and first embodiments are that FIG. 14 additionally has step C5 where data on the tissue number of a tissue having a non-decompression limit remaining time set in shortest non-decompression limit remaining time register TA is set in non-decompression diving attention tissue register Y after data on the non-decompression limit remaining time is set in shortest non-decompression limit remaining time register TA of RAM 8 at step C4. Therefore, in the no-decompression requiring process, non-decompression limit remaining times for tissues which require no decompression are calculated while the shortest non-decompression limit remaining time is being retrieved and data on the obtained retrieved time is set in shortest non-decompression limit remaining time register TA, and data on the tissue number of the tissue having the non-decompression limit remaining time whose data is set in shortest non-decompression limit remaining time register TA is set in non-decompression diving attention tissue register Y.

Figure 15:
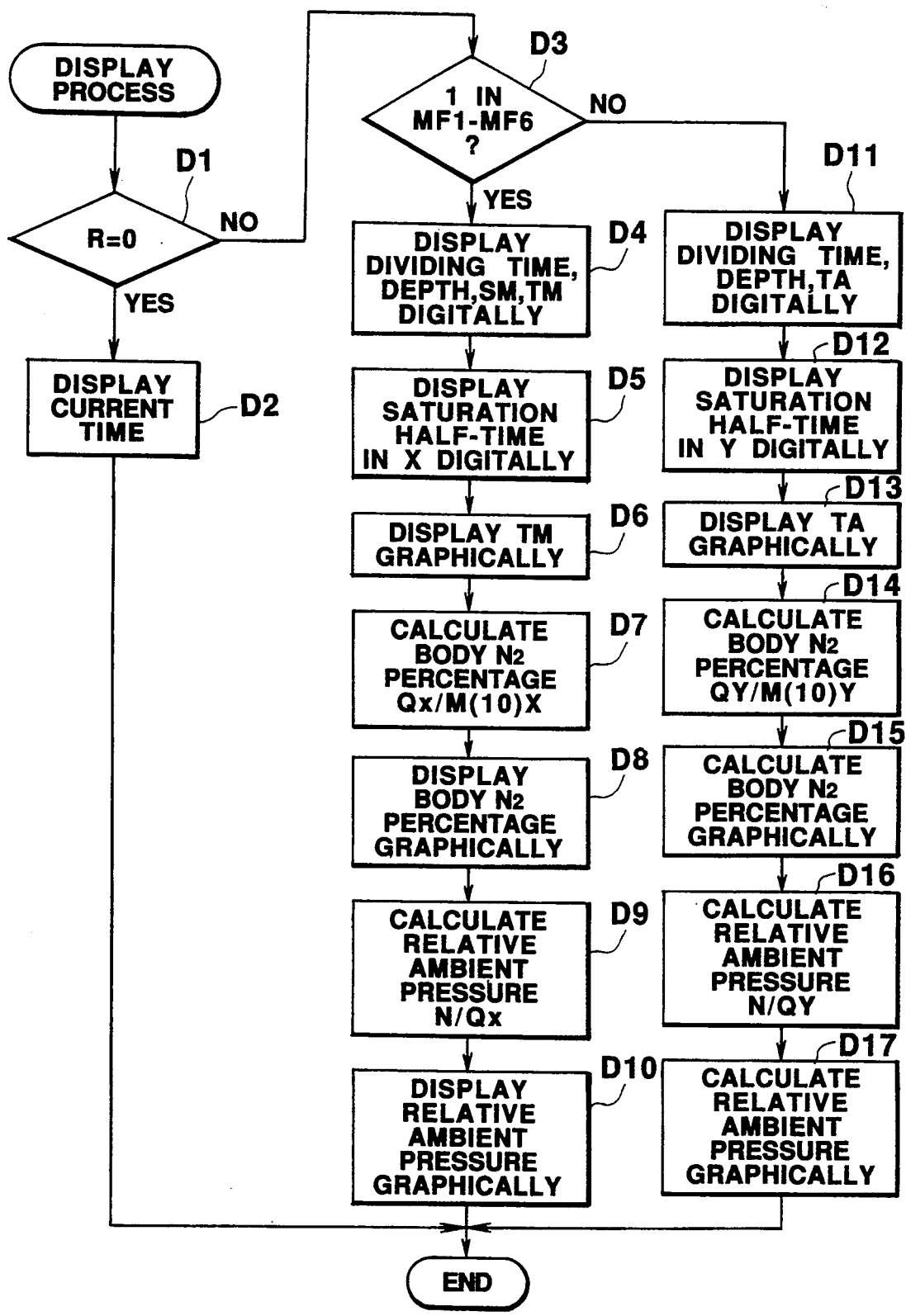
FIG. 15 is a flowchart indicative of the details of the display process performed by the depth meter of the second embodiment.

FIG. 15 is a flowchart indicative of the details of the display process. In this process, it is determined at step D1 whether the value of mode register R is 0 or whether the clock mode is used. If so, control passes to step D2 where the current time is displayed on digital display 25a of display 25.

When it is determined at step D1 that the value of mode register R is not 0 but 1 and the depth meter mode is used, control passes to step D3 where it is determined that 1 is set in any of diving type flags MF1–MF6 and that decompression of any tissue is required. When all the values in diving type flags MF1–MF6 are 0 and any tissue requires no decompression, control passes to step D11. At step D11 the diving time, depth and shortest non-decompression limit remaining time whose data is set in shortest non-decompression limit remaining time register TA are displayed in display segments on digital display 25a. For example, when the diving time is 20 minutes, the depth is 19.7 m and the shortest non-decompression limit remaining time is 3 minutes, the display on digital display 25a of FIG. 13 is as shown.

Figures 16, 17, 18:
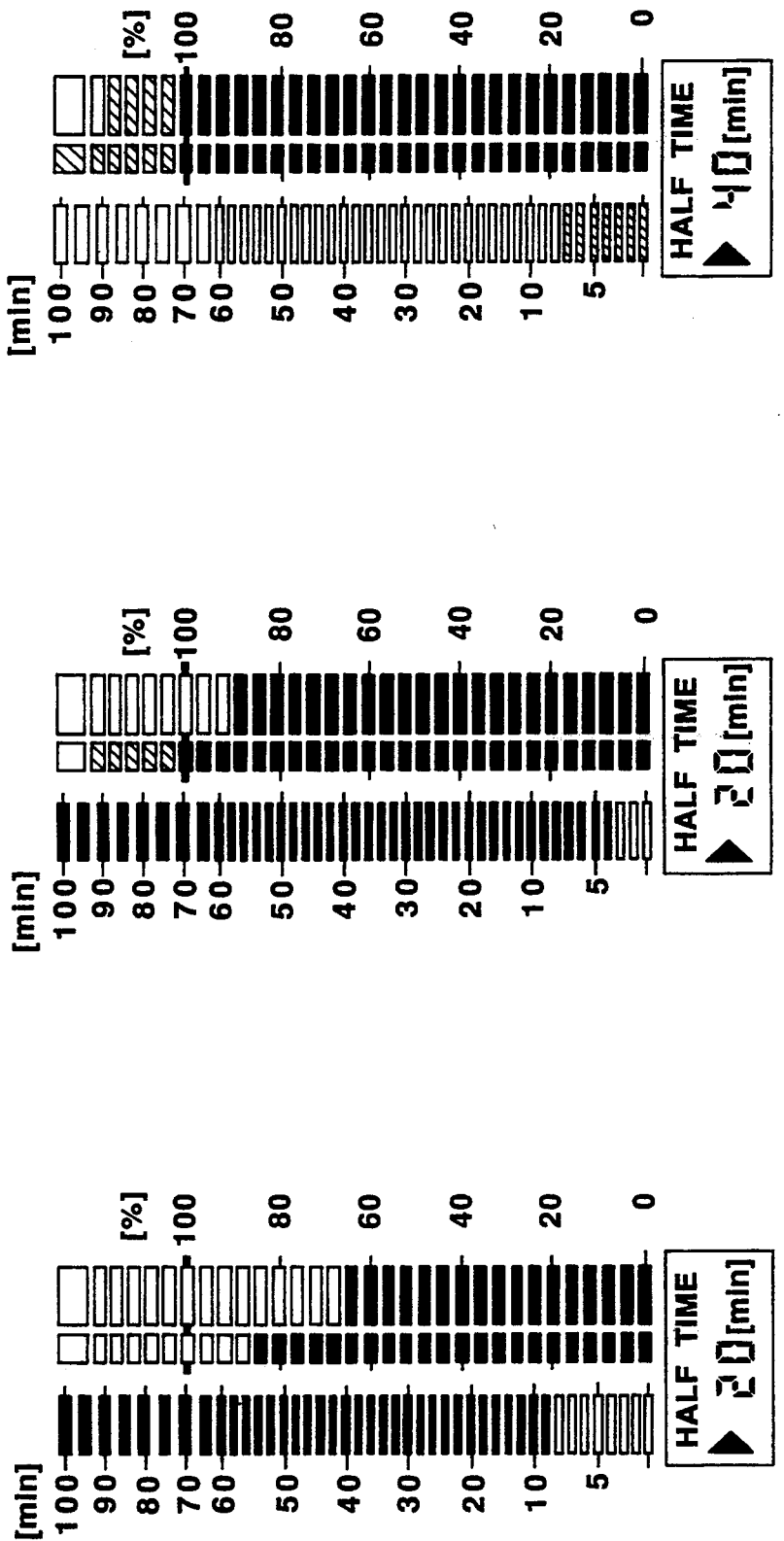
FIG. 16 illustrates a display on a graphic one of the displays of the FIG. 13 depth meter performed during non-decompression diving.
FIG. 17 illustrates another display on a graphic one of the displays of the FIG. 13 depth meter performed during non-decompression diving.
FIG. 18 illustrates a display on a graphic one of the displays of the FIG. 13 depth meter performed during decompression diving.

At step D12 the tissue having a tissue number whose data is set in non-decompression diving attention tissue register Y or the saturation half-time of the tissue having the shortest non-decompression limit remaining time is displayed on saturation half-time display 26d. For example, when the saturation half-time is 20 minutes, this display is as shown on saturation half-time display 26d of FIG. 13. At step D13 the shortest non-decompression Limit remaining time whose data is set in shortest non-decompression limit remaining time register TA is graphically displayed using bar graphic display segment 26a on graphic display 25b. After the processing at step D12, control passes to step D14, where the partial pressure of nitrogen in the tissue having the tissue number set in non-decompression diving attention tissue register Y (that is, the tissue having the shortest non-decompression limit remaining time, and to which the most careful attention is required to be paid from a standpoint of safety) is divided by the non-decompression limit value or the M value (M(10Y)) at a depth of 10 feet, and the result is multiplied by 100 to calculate a percentage of nitrogen in the body (%) (in this case, since the diving requires no decompression, the percentage is less than 100%). At step D15 the calculated percentage of nitrogen in the body is graphically displayed in bar graphic display segments 26c on graphic display 25b. At step D16 the partial pressure N of nitrogen gas in the breathed gas under the current ambient pressure is divided by the partial pressure of nitrogen in the tissue having tissue number whose data is set in non-decompression diving attention tissue register Y, and the result is multiplied by 100 to calculate a relative ambient pressure (%) (when this value is 100% or more, it is indicated that nitrogen is absorbed at that depth while the relative ambient pressure is 100% or less, it is indicated that nitrogen is discharged out of the body). At step D17 the calculated relative ambient pressure is graphically displayed in bar graphic display segments 26b on graphic display 25b (when the relative ambient pressure is 100% or more, that portion of the relative pressure exceeding 100% is displayed in a flashing manner). For example, if the non-decompression remaining time is 3 minutes; the percentage of nitrogen in the body is 90%; and the relative ambient pressure is 120%, the display on graphic display 25b is shown in FIG. 13 on the basis of the respective graphic display processes. FIG. 17 shows the display on graphic display 25b in this case on enlarged scale while that portion of the relative ambient pressure exceeding 100% is represented by thick hatched ones in bar graphic display segments 26b in a flashing manner. When, for example, the non-decompression limit remaining time is 8 minutes: the percentage of nitrogen in the body is 65%; and the relative ambient pressure is 85%, that is less than 100%, the graphic display is as shown in FIG. 16.

When it is determined at step D3 of FIG. 15 that 1 is set in any one of diving type flags MF1-MF6, that is, that at least one tissue requires decompression, control passes to step D4, where the diving time, depth, the deepest decompression stop depth whose data is set in deepest decompression stop depth register SM, and the deepest decompression depth stop time whose data is set in deepest decompression depth stop time register TM are displayed in display segments on digital display 25a (the deepest decompression stop depth is reduced to the values in meter and displayed).

At step D5 the saturation half-time for the tissue having a tissue number whose data is set in decompression diving attention tissue register X or the tissue having the maximum decompression stop depth (when the decompression stop depth is the same for two or more tissues and is the maximum, the tissue having a longer stop time) is displayed on saturation half-time display 26d. At step D6 the deepest decompression depth stop time whose data is stored in deepest decompression depth stop time register TN is distinguished from the display on the non-decompression limit remaining time displayed using bar graphic display segments 26a on graphic display 25b (step D13) in a flashing manner in order to clarify the requirement for decompression. At step D7 the partial pressure of nitrogen in the tissue having a tissue number whose data is set in decompression diving attention tissue register X or the tissue to which the maximum attention is required to be paid from a standpoint of safety is divided by M(10)X and the resulting value is multiplied by 100 to calculate a percentage of nitrogen in the body (%) (in this case, decompression is required and the percentage of nitrogen in the body is 100% or more). At step D8 the calculated percentage of nitrogen in the body is displayed using bar graphic display segments 26C and that portion of the percentage exceeding 100% is displayed in a flashing manner. Thereafter, at step D9 the partial pressure N of nitrogen gas in the breathed gas in the current ambient pressure is divided by the partial pressure of nitrogen in the tissue having a tissue number whose data is set in decompression diving attention tissue register X and the resulting value is multiplied by 100 to calculate the relative ambient pressure. At step D10 the relative ambient pressure calculated similarly is displayed graphically using bar graphic display segments 26b on graphic display 25b. When, for example, the deepest decompression depth stop time is 7 minutes; the percentage of nitrogen in the body is 115 percent; and the relative ambient pressure is 120 percent or more, the graphic display on graphic display 25b is as shown in FIG. 18 on the basis of the above respective graphic display processes (also in FIG. 18, the displayed thick hatched ones of bar graphic display segments 26a-26c are displayed in a flashing manner similarly to that mentioned above).

As described above, in the electronic depth meter of the second embodiment, means for displaying the shortest non-decompression limit remaining time in a graphic display manner and displaying whether the tissue absorbs or discharges inert gasses is provided, so that it is directly recognized whether the current depth increases or decreases the non-decompression limit remaining time.

(III) Third Embodiment

FIGS. 19-28 shows a third embodiment of the inventive electronic depth meter in which the relative relationship between the respective partial pressures of nitrogen in the tissues and the non-decompression limit values for the partial pressures of nitrogen in the respective tissues is displayed graphically and in which it also is displayed graphically and simultaneously whether the respective partial pressures of nitrogen in the tissues are increasing or decreasing.

Figure 19:
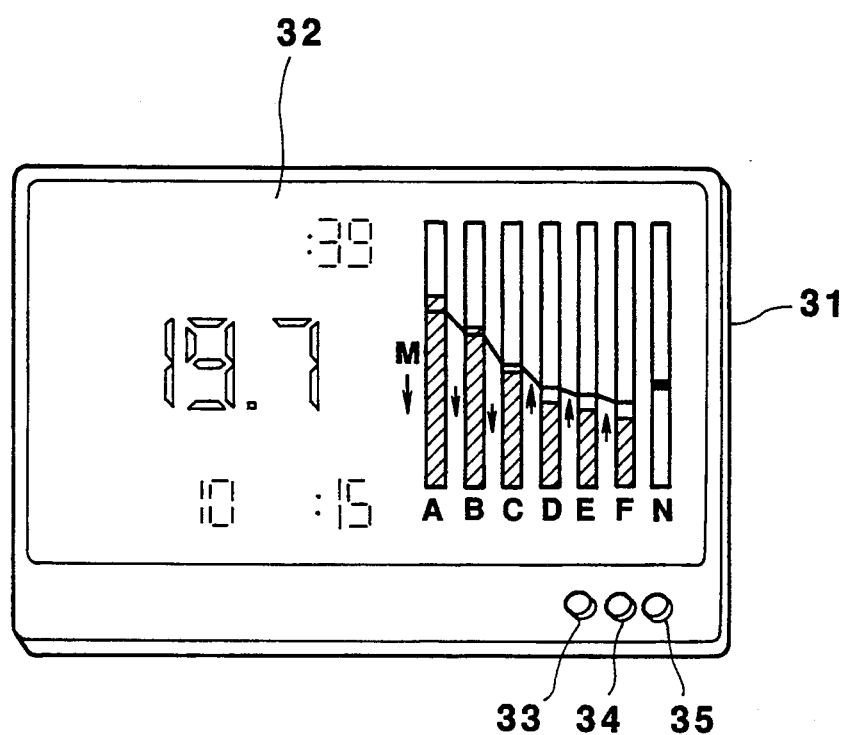
FIG. 19 shows the appearance of an electronic depth meter as a third embodiment of the present invention.
Figure 20:
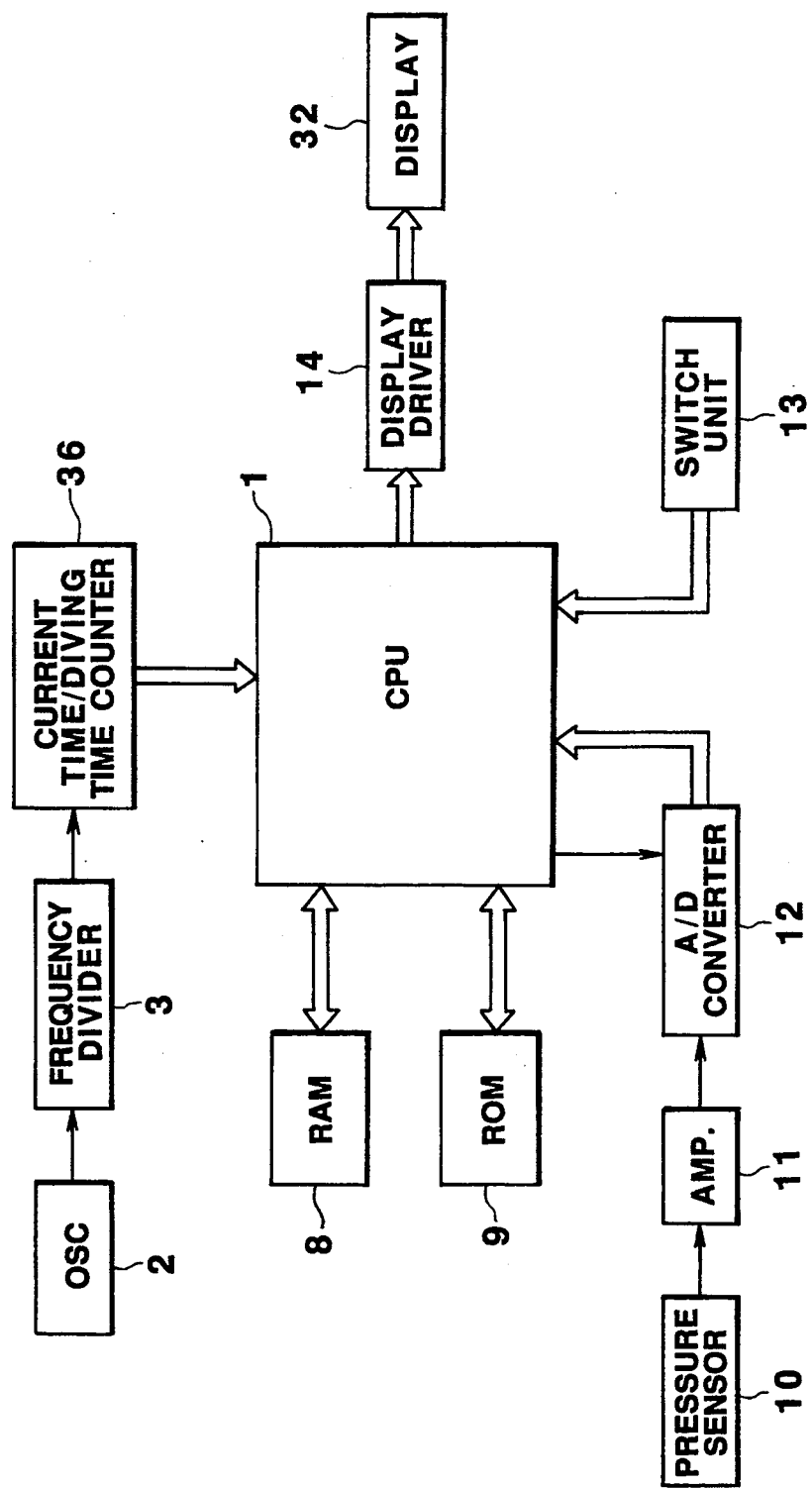
FIG. 20 is a block diagram indicative of the circuit structure of the electronic depth meter of FIG. 19.

FIG. 19 shows the appearance of the electronic depth meter of the third embodiment which has a display 32 and various switches 33–35 on its case 31.

Figure 21:
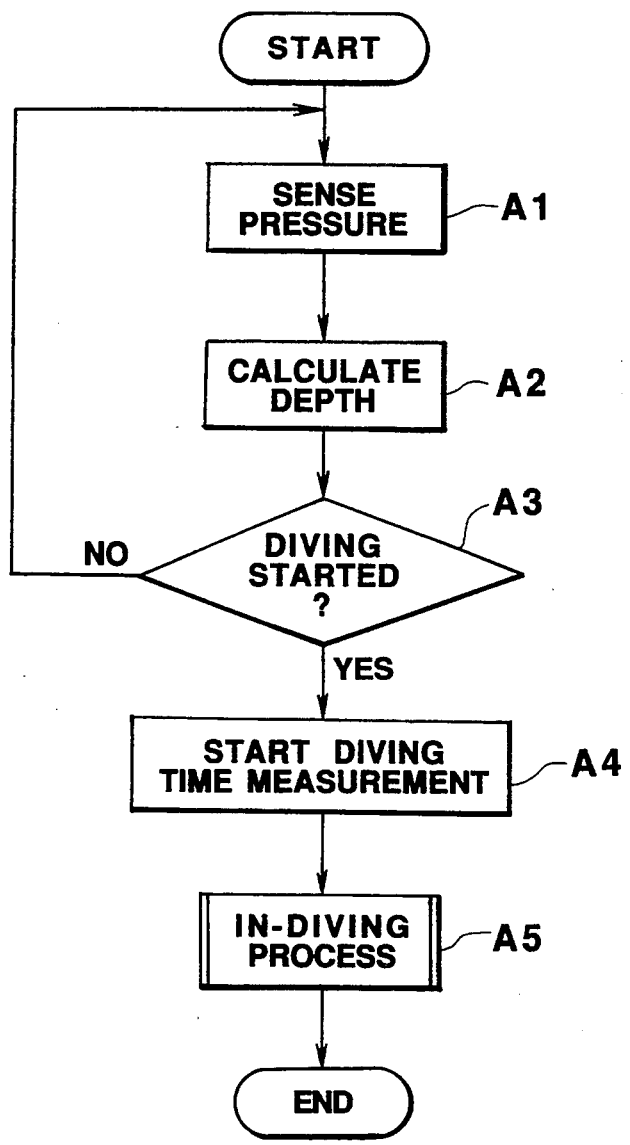
FIG. 21 is a general flowchart indicative of the outline of the operation of the FIG. 20 circuit.

FIG. 21 is a circuit block diagram of the electronic depth meter of the third embodiment which is provided with oscillator 2, frequency divider 3, time/diving time counter 36, CPU 1, ROM 9, RAM 8, pressure sensor 10, amplifier 11, A/D converter 12, switch unit 13, display driver 14, and display 32.

A clock signal output from oscillator 2 is divided by frequency divider 3 into a clock signal of 1 Hz, which is then delivered to time/diving time counter 36, which counts signals of 1 Hz and obtains and outputs the current time and diving time. CPU 1 drives display driver 14 in accordance with the current time and diving time from time/diving time counter 36 to display the current time and diving time on display 32.

ROM 9 stores a program used as the electronic depth meter, a clock and various programs required for the processing in other modes and data on safety permissible limit values of the partial pressure of nitrogen preset for ascending purposes and for each of several tissues of a human body during diving. The safety permissible limit values stored in this ROM 9 are the same as those on the table of decompression of FIG. 3 in the first embodiment.

Similarly to the first embodiment, RAM 8 is provided with nitrogen partial pressure memories Q1-Q6 which store the partial pressures of nitrogen in the tissues having tissue numbers 1-6, non-decompression limit remaining time memories MT1-MT6 which store the non-decompression limit remaining times for the tissues having tissue numbers 1-6, tissue designating register i, deepest decompression depth register SM, deepest decompression stop time register TM, shortest non-decompression limit remaining time register TA, pressure storage register HP which stores the detected pressure, and diving type register MF which stores data as to whether decompression diving is in progress. Diving type register MF stores 0 when all the tissues are for non-decompression diving while 1 is stored when at least one tissue is for decompression diving.

Figure 24:
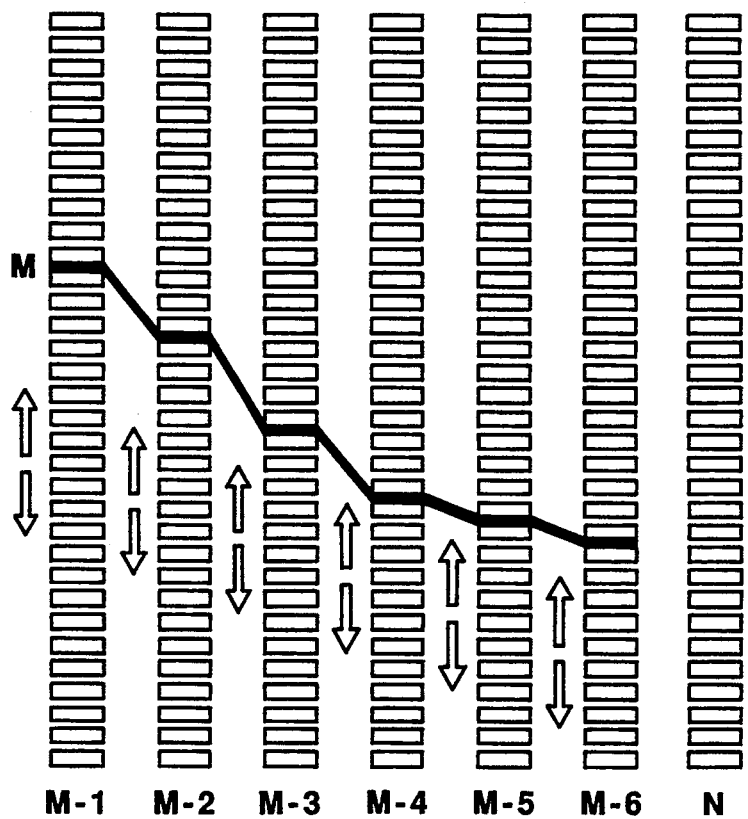
FIG. 24 illustrates the details of a graphic one of the displays of the FIG. 19 depth meter.

As shown in FIG. 24, display 32 is provided with six graphic display units each including a plurality of display segments disposed vertically in correspondence to printed characters M−1 to M−6 indicative of the respective tissues for display of their respective partial pressures of nitrogen. In addition, a single graphic display unit is provided which includes a plurality of display segments disposed vertically in correspondence to the printed character N for display of the partial pressure of nitrogen in the breathed gas under the current ambient pressure.

A polygonal line displayed by M indicative of the non-decompression limit value of the partial pressure of nitrogen in each tissue, that is, the M value at a depth of 10 feet, that is, the M(10)i, is formed by printing. An upward arrow display and a downward display indicative of whether the current partial pressure of nitrogen in that tissue is increasing or decreasing are provided close to the respective six graphic display units.

Pressure sensor 10 senses the pressure and out, puts a signal indicative of the result of the detection to amplifier 11, which amplifies the received signal and outputs the resulting signal to A/D converter 12. A/D converter 12, whose operation timing is controlled by CPU 1, converts the analog sensed signal from amplifier 11 to a digital signal and outputs the digital signal to CPU 1, which calculates the depth on the basis of the received digital signal and calculates the partial pressures of nitrogen in the tissues of the human body on the basis of the calculated depth. Display driver 14 is driven under control of CPU 1 to drive display 32 in accordance with data on display from CPU 1. By driving of display driver 14, the relative relationship between various data, especially, the current partial pressures of nitrogen in the tissues and the non-decompression limit quantities for the partial pressures of nitrogen is displayed as a diagram for displaying purposes.

Switch unit 13 denotes various switches 33–35 generally. CPU 1 detects the operational state of the switch unit 13 to perform a process corresponding to the operation of switch unit 13.

The operation of the electronic depth meter of the third embodiment will be described below. When the depth meter is set in a depth meter mode, the flow of FIG. 21 starts. First, at step A1 pressure is sensed from the output of the pressure sensor, and at step A2 the depth of water is calculated from the pressure. Then control passes to step 3, where it is checked whether diving has started. This determination relates to whether a depth cf more than 1.5 m continues over 10 seconds. If so, it is determined that diving has started. If not at step A3, control returns to step A1 and the processing at steps A2 and A3 is repeated. If it is determined at step A3 that diving has started, measurement of the diving time starts at step A4 and the in-diving process is performed at step A5.

Figure 22:
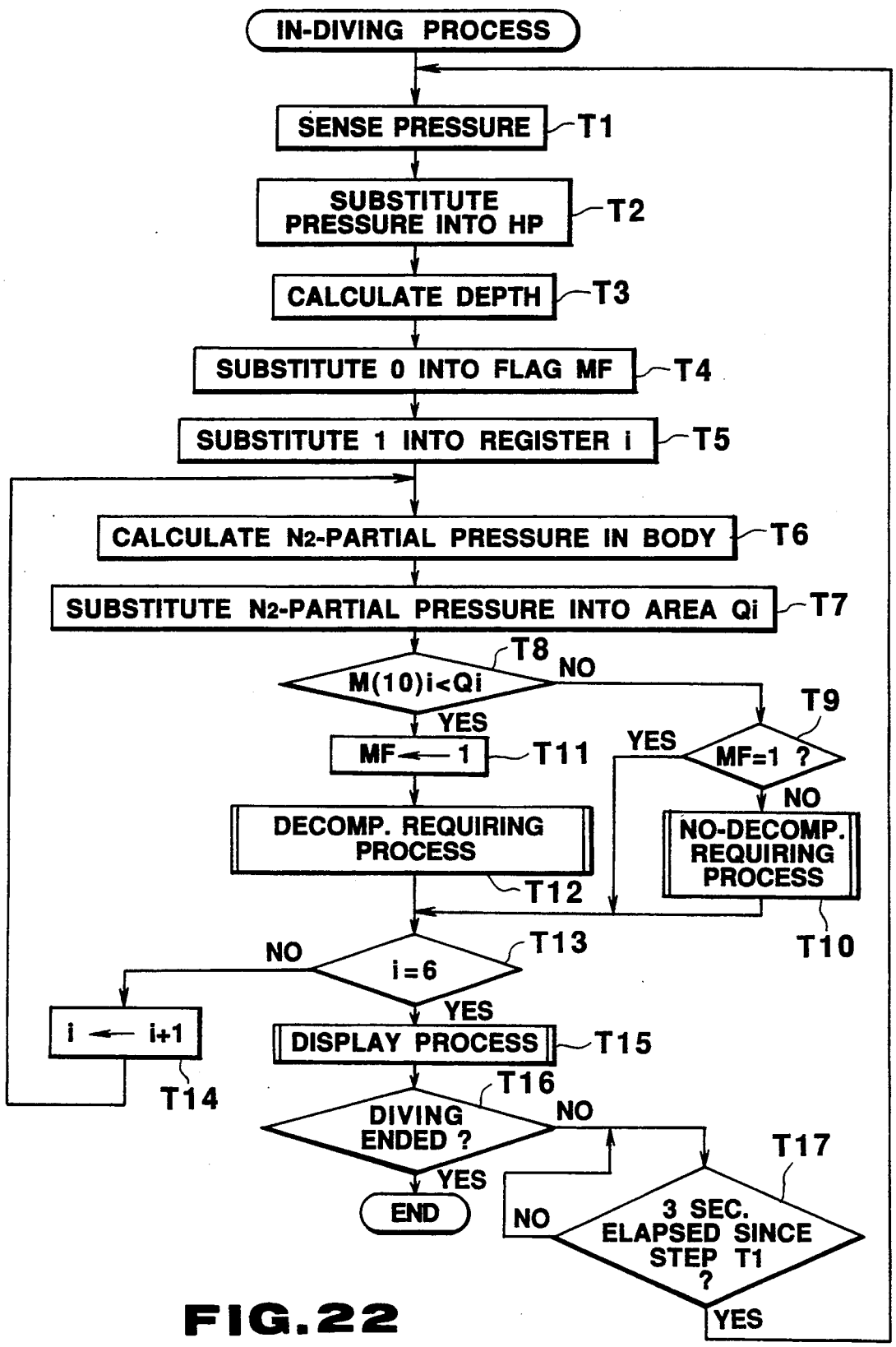
FIG. 22 is a flowchart indicative of the details of a during-diving process of FIG. 21.

FIG. 22 shows a flow indicative of the details of the in-diving process at step A5. At step T1 the pressure sensed. At step T2 data on the sensed pressure is stored in pressure storage register HP. Thereafter, at step T3 the depth of water is calculated from the pressure. At step T4 "0" is set in diving type flag MF. At step T5 "1" is set in tissue designating register i. Diving type flag MF is a register which stores whether decompression is required for ascent. If "0" is stored in the flag MF, no decompression is required while when "1" is stored, decompression is required. After the processing at step T5, control passes to step T6, where the partial pressure of nitrogen in tissue 1 designated by tissue designating register i is calculated, and data on the calculated partial pressure of nitrogen is stored in nitrogen partial pressure memory Q1 at step T7. At step T8 it is determined whether the partial pressure of nitrogen in the tissue calculated this time is larger than the non-decompression limit value (the value of M(10)l) which requires corresponding decompression. When it is determined at step T8 that the partial pressure of nitrogen calculated this time is not larger than the non-decompression limit value, control passes to step T8, where it is determined whether diving type flag MF is 1. If the value of tissue designating register i is 1, diving type flag MF is 0. Thus, control passes to step 10, where the no-decompression requiring process is performed. Control then passes to step T13. When it is determined at step T8 that the partial pressure of nitrogen whose data is stored in the nitrogen partial pressure memory Q1 exceeds the non-decompression limit value, that is, M(10)1, it is determined that decompression is required. Thus, at step T11 "1" is set in diving type flag MF. At step T12 the decompression requiring process is performed and then control passes to step T13, where it is determined whether the value of tissue designating register i is 6. When the value of tissue designating register i is 1, the value of the tissue designating register is incremented by one into 2 at step T14 and then control returns to step T6. Similar processing is performed for the respective tissues having tissue numbers 2–6 by repeating the steps T6–T14.

The no-decompression requiring process at step T10 is the same as that in FIG. 6 of the first embodiment. The decompression requiring process at step T12 is the same as that of FIG. 6 of the first embodiment, and further description thereof will be omitted.

When the no-decompression requiring process and the decompression requiring process for the tissues having tissue numbers 1–6 are completed in this way, it is determined at step T13 of FIG. 22 that the value of tissue designating register i has become "6" and control passes to step T15, where displaying operation is performed. It is determined at step T16 whether diving has ended. The determination as to whether diving has ended or not is made by detecting whether a depth less than 1.5 m has continued over 10 seconds. When that situation has continued so, it is determined that diving has ended. When it is determined at step T16 that diving has not ended yet, control passes to step T17, where it is determined whether three seconds have elapsed since the start of diving or after step T1. If not, control waits for three seconds and then returns to step T1 to perform a similar in-diving process.

Figure 23:
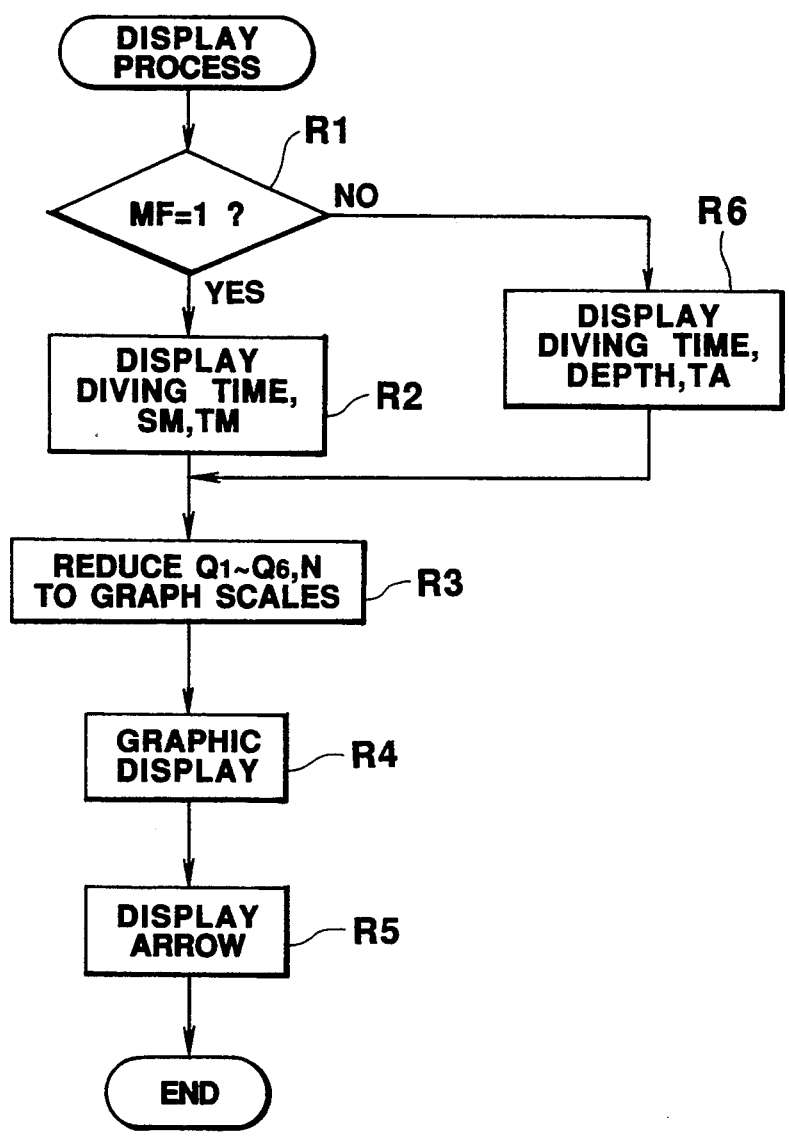
FIG. 23 is a flowchart indicative of the details of the display process of the FIG. 21 flow.

FIG. 23 is a flowchart indicative of the details of the display process at step T15. In this process, at step R1 it is determined whether diving type flag FM is 1. If so, this involves the need for stopping the decompression. Thus, control passes to step R2, where the diving time, depth as well as the decompression stop depth in deepest decompression register SM and the decompression stop time in deepest decompression stop time register TM are displayed on the display. At step R3 the partial pressure of nitrogen in the tissue Qi calculated at step T6 of FIG. 22 and the partial pressure of nitrogen N in the current ambient pressure are reduced to graphic scales and displayed graphically on display 3 at step R4.

When flag MF is not 1 at step R1, this shows that no decompression stop is required. Therefore, the diving time, depth as well as the non-decompression limit remaining time whose data is stored in shortest non-decompression limit remaining time register TA are displayed. At step R3 the partial pressures of nitrogen Q1–Q6 in the tissues and the partial pressure N of nitrogen in the breathed gas in the current ambient pressure are reduced to the graphic scales and graphically displayed on the display at step R4. Control then passes to step R5, where the partial pressure of nitrogen Qi in the respective tissues and the partial pressure of nitrogen N in the breathed gas in the current ambient pressure are compared. If the partial pressure of nitrogen in the breathed gas N in the current ambient pressure is larger, an upward arrow is displayed to clearly indicate that the partial pressure of nitrogen in the tissues is increasing, while if the partial pressure of nitrogen N in the breathed gas in the current ambient pressure is smaller, a downward arrow is displayed to clearly indicate that the partial pressure of nitrogen in the tissues is decreasing.

Figure 25:
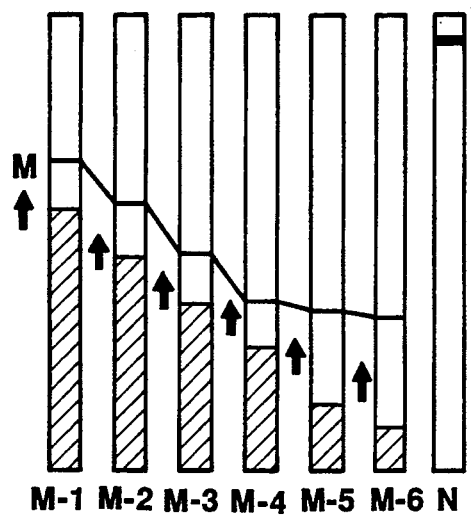
FIG. 25 illustrates a display on a graphic one of the displays of the FIG. 19 depth meter performed during non-decompression diving.
Figure 26:
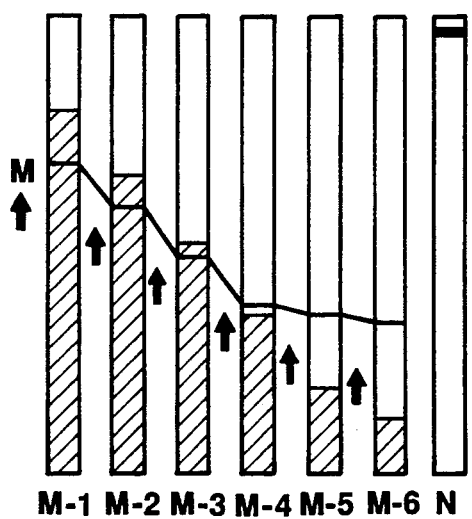
FIG. 26 illustrates a display on a graphic one of the displays of the FIG. 19 depth meter performed during decompression diving.
Figure 27:
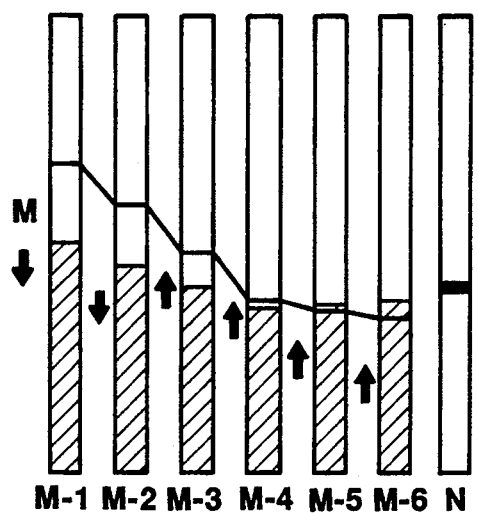
FIG. 27 illustrates another display on a graphic one of the displays of the FIG. 19 depth meter performed during decompression diving.
Figure 28:
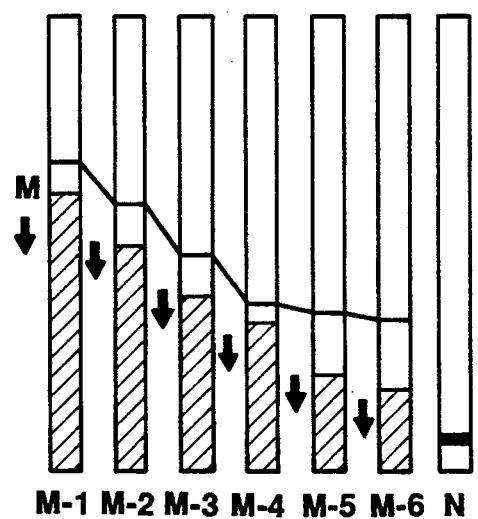
FIG. 28 illustrates a further display on a graphic one of the displays of the FIG. 19 depth meter performed during decompression diving.

The relative relationship between the partial pressure of nitrogen in the tissue and the non-decompression limit value of the partial pressure of nitrogen is displayed as shown in FIGS. 25–28. FIG. 25 shows the case of the non-decompression diving in which the partial pressure of nitrogen in the breathed gas in the current ambient pressure is high and in which the partial pressure of nitrogen in the respective tissues is increasing, but has not yet arrived at the non-decompression limit value or M(10)i. FIG. 26 shows partial decompression diving after non-decompression diving has been reached and wherein the partial pressures of nitrogen in tissues M−1, M−2, M−3 have exceeded non-decompression limit value, M(10)i, to thereby result in decompression diving. FIG. 27 shows that partial decompression diving has started like FIG. 26. In this case, the depth is small and the partial pressures of nitrogen in the breathed gas in the current ambient pressure are relatively small. Thus, FIG. 27 shows that the partial pressures of nitrogen in tissues M−5 and M−6 having long saturation half-time of nitrogen are increasing beyond M(10)i while the partial pressures of nitrogen in tissues M−1 and M−2 are decreasing. FIG. 28 shows the case in which decompression is in progress and in which the partial pressure of nitrogen in the breathed gas in the current ambient pressure is smaller than the M value (10)i of the respective tissues and that all the partial pressures of nitrogen in the tissues are decreasing.

As described above, in the electronic depth meter of the third embodiment the relative relationship between the respective partial pressures of nitrogen in the tissues during diving and non-decompression limit value of the partial pressure of nitrogen within which limit value ascent can be made in non-decompression is displayed as a diagram, especially, as a graph, so that the diver can more easily and appropriately recognize the relationship between the respective partial pressures of nitrogen in the tissues and the non-decompression limit value as well as that the respective partial pressures of nitrogen in the tissues are increasing or decreasing to thereby further improve safety during diving.

(IV) Fourth Embodiment

Figure 29:
FIG. 29 shows a display of non-decompression diving in an electronic depth meter as a fourth embodiment of the present invention.
Figure 30:
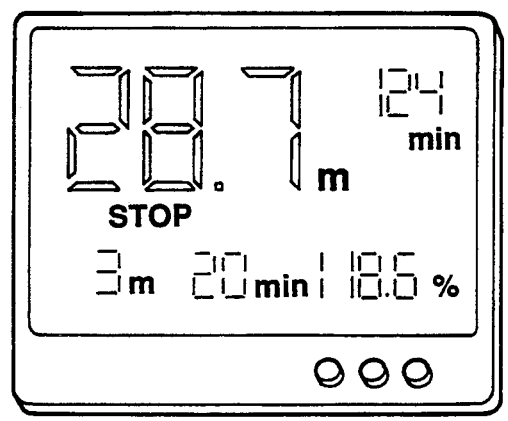
FIG. 30 shows a display of decompression diving in the depth meter of FIG. 29.
Figure 31:
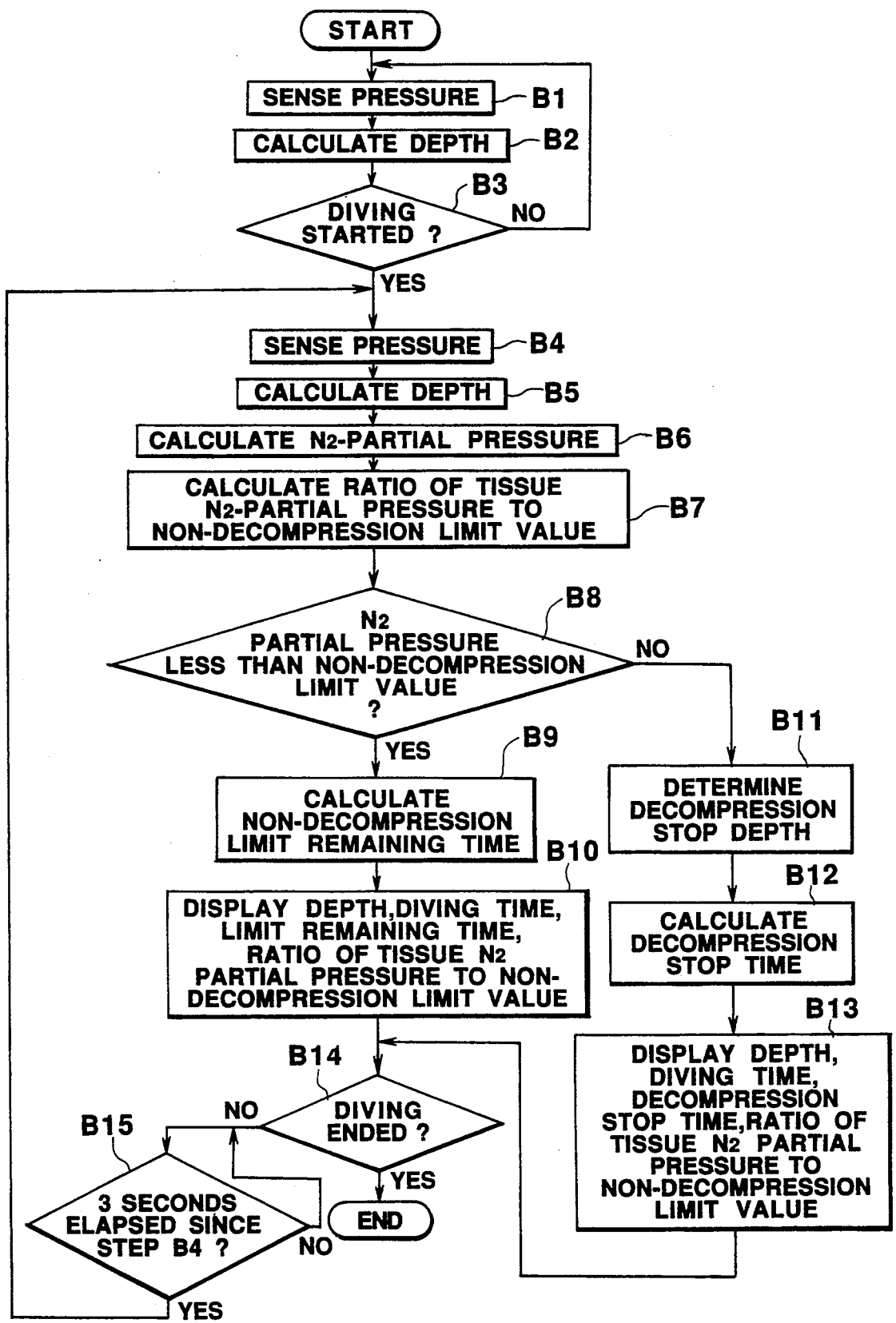
FIG. 31 is a flowchart indicative of the operation of the electronic depth meter of FIG. 29 in a depth meter mode.

FIGS. 29–31 shows a fourth embodiment of the inventive electronic depth meter which displays the percentage of the respective partial pressures of nitrogen in the current tissues to the corresponding non-decompression limit values of the partial pressures of nitrogen in the tissues.

The circuit structure of the electronic depth meter of the fourth embodiment is substantially the same as that of the depth meter of the third embodiment and further description thereof will be omitted.

When the depth meter is set in a depth meter mode, the flow of FIG. 31 starts.

At step B1 pressure is detected; at step B2 the depth is calculated; and at step B3 it is determined whether diving has started. This determination is made depending on whether a depth of more than 1.5 m continues over 10 seconds as in the third embodiment. If this condition is satisfied, it is determined that diving has started. If it is determined otherwise at step B3, control returns to step B1.

When at step B3 it is determined that diving has started, control returns to step B4, where the pressure is detected. At step B5, the depth is calculated on the basis of the sensed pressure. The diving time is measured since the start of the diving.

When the depth is calculated, the partial pressures of nitrogen in tissues different in saturation half-time are calculated at step B6. Thereafter, the ratio Ei of each of the partial pressures of nitrogen in the tissues to the non-decompression limit value of that tissue is calculated at step B7. This non-decompression limit value is the M value (M(10)i) at which decompression is required at a depth of 10 feet for each tissue. The above ratio is calculated from $$Ei = (\text{the partial pressure } Qi \text{ of nitrogen in a tissue}/M(10)i) \times 100[\%] \quad (4)$$

At step B8 it is determined whether all the partial pressures of nitrogen in the tissues are less than the corresponding non-decompression limit values (M(10)i).

When it is determined that all the partial pressures of nitrogen in the tissues are less than the corresponding non-decompression limit values, that is, no decompression is required, the non-decompression limit remaining times for the tissues are calculated at step B9. Then at step B10 the corresponding diving time and depth are displayed, the shortest one of non-decompression limit remaining times, the ratio of the partial pressure of nitrogen of the tissue having the shortest non-decompression limit remaining time to the non-decompression limit value are displayed on display 3.

FIG. 29 illustrates a display in the case of the non-decompression diving at step B10 in which display the depth is 25.9 m; the diving time is 35 minutes; and the non-decompression limit remaining time is 3 minutes: the ratio of the partial pressure of nitrogen in the tissue to the non-decompression limit value is 98.7%; and the characters FREE involves non-decompression diving.

When it is determined at step B8 that there is a tissue having the pressure of nitrogen which is larger than the non-decompression limit value among the tissues, that is, the diving is decompression diving which requires decompression, the decompression depth of the tissue having a partial pressure of nitrogen which is larger than the non-decompression limit value is calculated at step B11 and the decompression stop time is calculated at step B12.

At step B13 the current depth and diving time are displayed on display 3; the decompression stop depth obtained at step B11 (if the decompression depths for two or more tissues are obtained, the deepest decompression depth) is displayed; the decompression stop time at the deepest decompression stop depth (if there are two or more tissues having the deepest decompression depth, the longer decompression stop time) is displayed; and the ratio of the partial pressure of nitrogen whose decompression stop time is displayed to the non-decompression limit is displayed.

FIG. 30 illustrates a display of the decompression diving at step B13 indicating that the depth is 2.87 m; the diving time is 124 minutes; the decompression depth is 3 m; the decompression stop time is 20 minutes; and the ratio of the partial pressure of nitrogen in the body to the non-decompression limit value is 118.6% with the characters STOP indicating decompression diving.

When the processing at step B10 or B13 has ended, control passes to step B15, where it is determined whether diving has ended. This determination is made depending upon the criterion that a depth less than 1.5 m has continued for over 10 seconds as in the third embodiment. If so, it is determined that the diving has ended. If it is determined otherwise, it is determined at step B15 whether three seconds has elapsed since step B4. If not, control waits for three seconds and then passes to step S4, where a series of processing operations, starting with the pressure sensing, is performed similarly.

When it is determined at step S16 that diving has ended, the processing ends.

As just described above, since the electronic depth meter of the fourth embodiment outputs the ratio of the partial pressure of nitrogen in the tissue to the decompression limit value of the partial pressure of nitrogen, the diver can know the degree of danger which the current partial pressure of nitrogen in the tissue has, to thereby permit easy control of the diver's bodily strength during diving. As a result, safety of diving is further improved.

We claim:

1. An electronic depth meter comprising:
   pressure sensing means for sensing the ambient pressure of the depth meter to generate data representative of the sensed pressure;
   diving data generating means for receiving the data representative of the pressure generated from said pressure sensing means to generate data representative of the levels of an inert gas dissolved in a plurality of body tissues under water;
   limit value data storage means for storing data representative of respective limit values for the plurality of tissues within which limit values the corresponding tissues can ascend to the surface of water without decompression;
   remaining time data generating means for receiving data representative of the respective levels of an inert gas dissolved in the plurality of tissues from said diving data generating means and data representative of the corresponding limit values from said limit value data storage means to generate data representative of the respective remaining times up to the corresponding limit values at which the respective tissues are required to be decompressed;
   display means for simultaneously and graphically displaying data on the respective remaining times for the plurality of tissues generated by said remaining time data generating means.

2. An electronic depth meter according to claim 1, wherein said remaining time data generating means comprises:
   shortest-remaining time data detecting means for detecting the shortest one of the remaining times for the plurality of body tissues; and
   said display means comprises:
   shortest-remaining time data display means for digitally displaying data on the shortest time detected by said shortest remaining time data detecting means.

3. An electronic depth meter according to claim 1, wherein said diving data generating means comprises:
   decompression detecting means for comparing the data representative of the respective levels of the inert gas in the plurality of tissues and the data representative of the corresponding limit values to detect whether the respective tissues require decompression; and
   decompression stop time data calculating means for calculating data representative of the decompression stop time for a tissue from the data representative of the levels of the inert gas when said decompression detecting means has detected that the tissue requires decompression; and
   said display means comprises:
   display control means for causing the data representative of the decompression stop time data calculated by said decompression stop data calculating means to be displaced on said display means in place of the remaining time data for that tissue.

4. An electronic depth meter according to claim 3, wherein said diving data generating means comprises:
   decompression depth data calculating means for calculating data representative of a decompression stop depth for a tissue from the data representative of the levels of the inert gas when said decompression detecting means has detected that the tissue requires decompression; and
   said display means comprises:
   decompression stop depth data display means for displaying the data representative of the decompression stop depth calculated by said decompression depth data calculating means.

5. An electronic depth meter according to claim 1, wherein said diving data generating means comprises:
   depth data generating means for receiving the data representative of a pressure generated by said pressure detecting means to generate data on the depth; and
   said display means comprises:
   depth data display means for displaying the data representative of the depth generated by said depth data generating means.

6. An electronic depth meter according to claim 1, wherein said diving data generating means comprises:
   diving time data counting means for counting data representative of a diving time; and
   said display means comprises:
   diving time data display means for displaying the data representative of the diving time counted by said diving time data counting means.

7. An electronic depth meter according to claim 1, further comprising:
   time counting means for counting the current time; and
   said display means comprises:
   time display means for displaying the current time.

8. An electronic depth meter according to claim 1, further comprising:
a case having a pair of bands connected to corresponding opposite sides of said case for attaching said case to a wrist; and
wherein said case accommodates said pressure sensing means, said diving data generating means, said limit value data storage means, said remaining time data generating means and said display means therein.

9. An electronic depth meter comprising:
pressure sensing means for sensing the ambient pressure of the depth meter to generate data representative of the sensed pressure;
diving data generating means for receiving the data representative of the pressure produced by said pressure sensing means to generate data representative of the respective levels of an inert gas dissolved in a plurality of body tissues under water and data representative of the level of an inert gas in the breathed gas;
limit value data storage means for storing data representative of respective limit valves for the plurality of tissues within which limit values the body tissues can ascend to the surface of water without decompression;
remaining time generating means for receiving data representative of the levels of the inert gas dissolved in the plurality of tissues from said diving data generating means and data representative of the limit values from said limit value data storage means to generate data representative of the respective remaining times up to the corresponding limit values for non-decompression diving;
tissue detecting means for detecting a tissue having the shortest remaining time among the plurality of tissues;
ratio data generating means generating data representative of a ratio of the data representative of the level of inert gas in the breathed gas to the data representative of the level of the inert gas in the tissue detected by said tissue detecting means;
display means for displaying the data representative of the ratio generated by said percentage generating means.

10. An electronic depth meter according to claim 9, wherein said display means comprises percentage graphic display means for displaying the data representative of the ratio.

11. An electronic depth meter according to claim 9, wherein said display means comprises remaining time display means for displaying the shortest one of the remaining times which the tissue detected by said tissue detecting means has.

12. An electronic depth meter according to claim 9, wherein said display means comprises tissue display means for displaying the tissue having the shortest one of the remaining times detected by said tissue detecting means.

13. An electronic depth meter according to claim 9, further comprising:
limit ratio generating means for obtaining data representative of the limit ratio of data representative of the level of the inert gas in the tissue detected by said tissue detecting means to data representative of the limit value of the inert gas in the tissue; and
said display means comprises:
limit ratio data display means for displaying the data representative of the limit ratio generated by said limit ratio generating means.

14. An electronic depth meter according to claim 13, wherein said display means comprises:
graphic display means for displaying the data representative of the limit ratio.

15. An electronic depth meter according to claim 9, wherein said diving data generating means comprises:
decompression detecting means for comparing the data representative of the respective levels of the inert gas in the plurality of tissues and the data representative cf the corresponding limit values to detect whether the respective tissues require decompression; and
decompression stop time data calculating means for calculating data representative of the decompression stop time for a tissue from the data representative oil the levels of the inert gas when said decompression detecting means has detected that the tissue requires decompression; and
said display means comprises:
decompression stop time data display means for displaying the data representative of the decompression stop time calculated by said decompression stop time data calculating means.

16. An electronic depth meter according to claim 15, wherein said diving data generating means comprises:
decompression depth data calculating means for calculating data representative of the decompression stop depth for a tissue from the data representative of the levels of the inert gas when said decompression detecting means has detected that the tissue requires decompression; and
said display means comprises:
decompression stop depth data display means displaying the data representative of the decompression stop depth generated by said decompression depth data calculating means.

17. An electronic depth meter according to claim 9, wherein said diving data generating means comprises:
depth data generating means for receiving the data representative of a pressure generated by said pressure detecting means to generate data representative of the depth; and
said display means comprises:
depth data display means for displaying the data representative of the depth generated by said depth data generating means.

18. An electronic depth meter according to claim 9, wherein said diving data generating means comprises:
diving time data counting means for counting data representative of a diving time; and
said display means comprises:
diving time data display means for displaying the data representative of the diving time counted by said diving time data counting means.

19. An electronic depth meter according to claim 9, further comprising:
time counting means for counting the current time; and
said display means comprises:
time display means for displaying the current time.

20. An electronic depth meter according to claim 9, further comprising:
a case having a pair of bands connected to corresponding opposite sides of said case for attaching said case to a wrist; and wherein said case accommodates said pressure sensing means, said diving data generating means, said limit value data storage means, said remaining time generating means, said tissue detecting means, said ratio data generating means, and said display means therein.

21. An electronic depth meter comprising:
pressure sensing means for sensing the ambient pressure of the depth meter to generate data representative of the sensed pressure;
diving data generating means for receiving the data representative of the pressure generated by said pressure sensing means to generate data representative of the respective levels of an inert gas dissolved in a plurality of body tissues and data representative of the level of an inert gas in the breathed gas;
display means for displaying data representative of the respective levels of the inert gas dissolved in the plurality of body tissues and data representative of the level of the inert gas in the breathed gas simultaneously side by side on the same scale.

22. An electronic depth meter according to claim 21, wherein said display means comprises increase display means for indicating that the respective levels of the inert gas in the tissues are increasing.

23. An electronic depth meter according to claim 21, wherein said display means comprises decrease display means for indicating that the respective levels of the inert gas in the tissues are decreasing.

24. An electronic depth meter according to claim 21, further comprising:
limit value data storage means for storing data representative of limit values for the plurality of body tissues within which the body tissues can ascend to a surface of water in a non-decompression state;
said diving data generating means comprises:
means for receiving the data representative of the respective levels of the inert gas in the tissues and the data representative of the limit values to generate data representative of the respective remaining times for the tissues up to corresponding limits where the tissues require decompression;
means for detecting the shortest one of the remaining times for the tissues up to corresponding limits to non-decompression; and
said display means comprises remaining time data display means for displaying data representative of the shortest remaining time.

25. An electronic depth meter according to claim 21, further comprising:
limit value data storing means for storing data representative of limit values for a plurality of body tissues within which limit values the body tissues can ascend to a surface of water in a non-decompression state;
said diving data generating means comprises:
decompression detecting means for comparing the data representative of the respective levels of the inert gas in the tissues and the data representative of the corresponding limit values to determine whether the respective tissues require decompression;
decompression stop time data calculating means for calculating data representative of a decompression stop time for a tissue from the data representative of the levels of the inert gas when the decompression detecting means has detected that tissue requires decompression; and
said display means comprises decompression stop time data displaying means for displaying the data representative of the decompression stop time calculated by said decompression stop time data calculating means.

26. An electronic depth meter according to claim 25, wherein said diving data generating means comprises:
decompression depth data calculating means for calculating data representative of a decompression stop depth for a tissue from the data representative of the levels of the inert gas when said decompression detecting means has detected that the tissue requires decompression; and
said display means comprises:
decompression stop depth data display means for displaying the data representative of the decompression stop depth calculated by said decompression depth data calculating means.

27. An electronic depth meter according to claim 21, wherein said diving data generating means comprises:
depth data generating means for receiving the data representative of a pressure generated by said pressure detecting means to generate data representative of the depth; and
said display means comprises:
depth data display means for displaying the data representative of the depth generated by said depth data generating means.

28. An electronic depth meter according to claim 21, wherein said diving data generating means comprises:
diving time data counting means for counting data representative of a diving time; and
said display means comprises:
diving time data display means for displaying the data representative of the diving time counted by said diving time data counting means.

29. An electronic depth meter according to claim 21, further comprising:
time counting means for counting the current time; and
said display means comprises:
time display means for displaying the current time.

30. An electronic depth meter according to claim 21, further comprising:
a case having a pair of bands connected to corresponding opposite sides of said case for attaching said case to a wrist; and
wherein said case accommodates said pressure sensing means, said diving data generating means, and said display means therein.

31. An electronic depth meter comprising:
pressure sensing means for sensing the ambient pressure of the depth meter to generate pressure data representative of the sensed pressure;
inert gas level data generating means for calculating levels of an inert gas dissolved in a plurality of body tissues of a user under water based on the pressure data generated by said pressure sensing means, and for generating gas level data representative of the calculated levels of the inert gas;
limit value data storage means for storing limit value data representative of limit values for the plurality of body tissues, the limit values representing values, respectively, which allow the body tissues to ascend to a surface of water without decompression;

calculating means for calculating a percentage of the level of the inert gas dissolved in one of the body tissues, which percentage is represented by the gas level data generated by said inert gas level data generating means, relative to the limit value for said body tissue which is represented by the limit value data stored in said limit value data storage means, and for generating percentage data representative of the calculated percentage of the level of the inert gas to the relevant limit value; and display means for display the percentage data generated by said calculating means.

32. An electronic depth meter according to claim 31, wherein said calculating means comprises:

remaining time calculating means for calculating remaining times required respectively before the body tissues need to be decompressed, using the gas level data generated by said inert gas level data generating means and the limit value data stored in said limit value data storage means; and detecting means for detecting the shortest remaining time among the remaining times calculated by said remaining time calculating means;

and wherein said display means comprises:

remaining time data display means for displaying data representative of the shortest remaining time detected by said detecting means.

33. An electronic depth meter according to claim 31, wherein said calculating means comprises:

decompression detecting means for comparing the gas level data generated by said inert gas level data generating means with the limit value data stored in said limit value data storage means to detect whether the respective body tissues require decompression; and decompression stop time data calculating means for calculating decompression time data representative of the decompression stop time for a body tissue from the gas level data generated by said inert gas level data generating means when said decompression detecting means determines that the body tissue requires decompression;

and wherein said display means comprises:

decompression stop time data display means for displaying the decompression time data calculated by said decompression stop time data calculating means.

34. An electronic depth meter according to claim 33, wherein said calculating means comprises:

decompression depth data calculating means for calculating decompression depth data representative of a decompression stop depth for a body tissue from the gas level data generated by said inert gas level data generating means when said decompression detecting means determines that the body tissue requires decompression;

and wherein said display means comprises:

decompression stop depth data display means for displaying the decompression depth data calculated by said decompression depth data calculating means.

35. An electronic depth meter according to claim 31, wherein said calculating means comprises:

depth data generating means for calculating a depth based on the pressure data generated by said pressure sensing means, and for generating depth data representative of the calculated depth;

and wherein said display means comprises:

depth data display means for displaying the depth data generated by said depth data generating means.

36. An electronic depth meter according to claim 31, wherein said calculating means comprises:

diving time data counting means for counting time data representative of a diving time;

and wherein said display means comprises:

diving time data display means for displaying the time data counted by said diving time data counting means.

37. An electronic depth meter according to claim 31, further comprising:

time counting means for counting the current time; and said display means comprises;

time display means for displaying the current time.

38. An electronic depth meter according to claim 31, further comprising:

a case having a pair of bands connected to corresponding opposite sides of said case for attaching said case to a wrist; and wherein said case accommodates said pressure sensing means, said inert gas level data generating means, said limit value data storage means, said calculating means and said display means therein.

39. An electronic depth meter according to claim 31, wherein said display means comprises:

digital display means for digitally displaying the percentage data generated by said calculating means.

40. An electronic depth meter according to claim 31, wherein said display means comprises:

analog display means including plural display elements which are disposed and selectively driven to display data in an analog manner, for displaying the percentage data generated by said calculating means in an analog manner.

41. An electronic depth meter according to claim 31, wherein said calculating means comprises:

remaining time calculating means for calculating remaining times required respectively before the body tissues need to be decompressed from the gas level data generated by said inert gas level data generating means and the limit value data stored in said limit value data storage means; and detecting means for detecting the shortest remaining time among the remaining times calculated by said remaining time calculating means;

and wherein said display means comprises:

display control means for displaying only the data representative of the shortest remaining time detected by said detecting means.

* * * * *